US012099940B1

(12) United States Patent
Chen et al.

(10) Patent No.: US 12,099,940 B1
(45) Date of Patent: Sep. 24, 2024

(54) BEHAVIOR ANALYSIS USING DISTRIBUTED REPRESENTATIONS OF EVENT DATA

(71) Applicant: Experian Information Solutions, Inc., Costa Mesa, CA (US)

(72) Inventors: Kevin Chen, San Diego, CA (US); Mason Carpenter, Richmond, VA (US); Shanji Xiong, San Diego, CA (US); Honghao Shan, San Diego, CA (US); Hua Li, San Diego, CA (US); Olcay Boz, San Diego, CA (US); Zhixuan Wang, Irvine, CA (US)

(73) Assignee: Experian Information Solutions, Inc., Costa Mesa, CA (US)

(*) Notice: Subject to any disclaimer, the term of this patent is extended or adjusted under 35 U.S.C. 154(b) by 0 days.

(21) Appl. No.: 17/468,360

(22) Filed: Sep. 7, 2021

Related U.S. Application Data

(63) Continuation of application No. 15/199,291, filed on Jun. 30, 2016, now Pat. No. 11,151,468.

(60) Provisional application No. 62/188,252, filed on Jul. 2, 2015.

(51) Int. Cl.
*G06N 7/01* (2023.01)
*G06Q 30/0202* (2023.01)

(52) U.S. Cl.
CPC ............ *G06N 7/01* (2023.01); *G06Q 30/0202* (2013.01)

(58) Field of Classification Search
CPC .............. G06N 7/00–005; G06N 20/00; H04L 63/1425; G06Q 20/401; G06Q 20/4016

USPC ............ 706/12, 45–47; 705/14.26, 14.47, 75, 705/318
See application file for complete search history.

(56) References Cited

U.S. PATENT DOCUMENTS

| 2,074,513 | A | 3/1937 | Mills |
| 3,316,395 | A | 4/1967 | Lavin et al. |
| 3,752,904 | A | 8/1973 | Waterbury |
| 4,163,290 | A | 7/1979 | Sutherlin et al. |

(Continued)

FOREIGN PATENT DOCUMENTS

| AU | 2022291564 | 7/2023 |
| CA | 3 058 653 | 4/2020 |

(Continued)

OTHER PUBLICATIONS

Hu et al. "Robust Support Vector Machines for Anomaly Detection in Computer Security", 2003, Proceedings of the 2003 International Conference on Machine Learning and Applications.*

(Continued)

*Primary Examiner* — Daniel T Pellett
(74) *Attorney, Agent, or Firm* — Knobbe, Martens Olson & Bear, LLP

(57) ABSTRACT

The features relate to artificial intelligence directed detection of user behavior based on complex analysis of user event data including language modeling to generate distributed representations of user behavior. Further features are described for reducing the amount of data needed to represent relationships between events such as transaction events received from card readers or point of sale systems. Machine learning features for dynamically determining an optimal set of attributes to use as the language model as well as for comparing current event data to historical event data are also included.

20 Claims, 17 Drawing Sheets

(56) References Cited

U.S. PATENT DOCUMENTS

| | | | |
|---|---|---|---|
| 5,274,547 A | 12/1993 | Zoffel et al. | |
| 5,323,315 A | 6/1994 | Highbloom | |
| 5,386,104 A * | 1/1995 | Sime | G06Q 20/4014 |
| | | | 235/382 |
| 5,414,833 A | 5/1995 | Hershey et al. | |
| 5,454,030 A | 9/1995 | de Oliveira et al. | |
| 5,504,675 A | 4/1996 | Cragun et al. | |
| 5,563,783 A | 10/1996 | Stolfo et al. | |
| 5,627,886 A | 5/1997 | Bowman | |
| 5,679,940 A | 10/1997 | Templeton et al. | |
| 5,696,907 A | 12/1997 | Tom | |
| 5,696,965 A | 12/1997 | Dedrick | |
| 5,739,512 A | 4/1998 | Tognazzini | |
| 5,742,775 A | 4/1998 | King | |
| 5,745,654 A | 4/1998 | Titan | |
| 5,752,242 A | 5/1998 | Havens | |
| 5,754,632 A | 5/1998 | Smith | |
| 5,774,868 A | 6/1998 | Cragun et al. | |
| 5,793,497 A | 8/1998 | Funk | |
| 5,809,478 A | 9/1998 | Greco et al. | |
| 5,819,226 A | 10/1998 | Gopinathan et al. | |
| 5,819,260 A | 10/1998 | Lu et al. | |
| 5,822,741 A | 10/1998 | Fischthal | |
| 5,832,068 A | 11/1998 | Smith | |
| 5,842,178 A | 11/1998 | Giovannoli | |
| 5,870,721 A | 2/1999 | Norris | |
| 5,872,921 A | 2/1999 | Zahariev et al. | |
| 5,878,403 A | 3/1999 | DeFrancesco | |
| 5,879,297 A | 3/1999 | Haynor et al. | |
| 5,884,289 A | 3/1999 | Anderson et al. | |
| 5,912,839 A | 6/1999 | Ovshinsky et al. | |
| 5,913,196 A | 6/1999 | Talmor et al. | |
| 5,943,666 A | 8/1999 | Kleewein et al. | |
| 5,950,179 A | 9/1999 | Buchanan et al. | |
| 5,987,440 A | 11/1999 | O'Neil et al. | |
| 5,999,907 A | 12/1999 | Donner | |
| 5,999,940 A | 12/1999 | Ranger | |
| 6,023,694 A | 2/2000 | Kouchi et al. | |
| 6,029,139 A | 2/2000 | Cunningham et al. | |
| 6,029,149 A | 2/2000 | Dykstra et al. | |
| 6,029,154 A | 2/2000 | Pettitt | |
| 6,029,194 A | 2/2000 | Tilt | |
| 6,044,357 A | 3/2000 | Garg | |
| 6,055,570 A | 4/2000 | Nielsen | |
| 6,094,643 A | 7/2000 | Anderson et al. | |
| 6,119,103 A | 9/2000 | Basch et al. | |
| 6,125,985 A | 10/2000 | Amdahl et al. | |
| 6,142,283 A | 11/2000 | Amdahl et al. | |
| 6,144,988 A | 11/2000 | Kappel | |
| 6,157,707 A | 12/2000 | Baulier et al. | |
| 6,182,219 B1 | 1/2001 | Feldbau et al. | |
| 6,208,720 B1 | 3/2001 | Curtis et al. | |
| 6,249,228 B1 | 6/2001 | Shirk et al. | |
| 6,253,203 B1 | 6/2001 | O'Flaherty et al. | |
| 6,254,000 B1 | 7/2001 | Degen et al. | |
| 6,263,447 B1 | 7/2001 | French et al. | |
| 6,269,349 B1 | 7/2001 | Aieta et al. | |
| 6,282,658 B2 | 8/2001 | French et al. | |
| 6,285,983 B1 | 9/2001 | Jenkins | |
| 6,285,987 B1 | 9/2001 | Roth et al. | |
| 6,292,795 B1 | 9/2001 | Peters et al. | |
| 6,311,169 B2 | 10/2001 | Duhon | |
| 6,317,783 B1 | 11/2001 | Freishtat et al. | |
| 6,321,339 B1 | 11/2001 | French et al. | |
| 6,330,546 B1 | 12/2001 | Gopinathan et al. | |
| 6,397,197 B1 | 5/2002 | Gindlesperger | |
| 6,418,436 B1 | 7/2002 | Degen et al. | |
| 6,424,956 B1 | 7/2002 | Werbos | |
| 6,448,889 B1 | 9/2002 | Hudson | |
| 6,456,984 B1 | 9/2002 | Demoff et al. | |
| 6,496,936 B1 | 12/2002 | French et al. | |
| 6,505,193 B1 | 1/2003 | Musgrave et al. | |
| 6,510,415 B1 | 1/2003 | Talmor et al. | |
| 6,513,018 B1 | 1/2003 | Culhane | |
| 6,532,459 B1 | 3/2003 | Berson | |
| 6,542,894 B1 | 4/2003 | Lee et al. | |
| 6,543,683 B2 | 4/2003 | Hoffman | |
| 6,553,495 B1 | 4/2003 | Johansson et al. | |
| 6,571,334 B1 | 5/2003 | Feldbau et al. | |
| 6,597,775 B2 | 7/2003 | Lawyer et al. | |
| 6,612,488 B2 | 9/2003 | Suzuki | |
| 6,615,193 B1 | 9/2003 | Kingdon et al. | |
| 6,658,393 B1 | 12/2003 | Basch et al. | |
| 6,662,023 B1 | 12/2003 | Helle | |
| 6,696,941 B2 | 2/2004 | Baker | |
| 6,700,220 B2 | 3/2004 | Bayeur et al. | |
| 6,714,918 B2 | 3/2004 | Hillmer et al. | |
| 6,735,572 B2 | 5/2004 | Landesmann | |
| 6,740,875 B1 | 5/2004 | Ishikawa et al. | |
| 6,748,426 B1 | 6/2004 | Shaffer et al. | |
| 6,751,626 B2 | 6/2004 | Brown et al. | |
| 6,796,497 B2 | 9/2004 | Benkert et al. | |
| 6,811,082 B2 | 11/2004 | Wong | |
| 6,829,711 B1 | 12/2004 | Kwok et al. | |
| 6,850,606 B2 | 2/2005 | Lawyer et al. | |
| 6,857,073 B2 | 2/2005 | French et al. | |
| 6,866,586 B2 | 3/2005 | Oberberger et al. | |
| 6,871,287 B1 | 3/2005 | Ellingson | |
| 6,873,979 B2 | 3/2005 | Fishman et al. | |
| 6,898,574 B1 | 5/2005 | Regan | |
| 6,907,408 B2 | 6/2005 | Angel | |
| 6,908,030 B2 | 6/2005 | Rajasekaran et al. | |
| 6,913,194 B2 | 7/2005 | Suzuki | |
| 6,918,038 B1 | 7/2005 | Smith et al. | |
| 6,920,435 B2 | 7/2005 | Hoffman et al. | |
| 6,928,546 B1 | 8/2005 | Nanavati et al. | |
| 6,930,707 B2 | 8/2005 | Bates et al. | |
| 6,934,849 B2 | 8/2005 | Kramer et al. | |
| 6,934,858 B2 | 8/2005 | Woodhill | |
| 6,965,881 B1 | 11/2005 | Brickell et al. | |
| 6,965,997 B2 | 11/2005 | Dutta | |
| 6,973,462 B2 | 12/2005 | Dattero et al. | |
| 6,973,575 B2 | 12/2005 | Arnold | |
| 6,983,381 B2 | 1/2006 | Jerdonek | |
| 6,983,882 B2 | 1/2006 | Cassone | |
| 6,991,174 B2 | 1/2006 | Zuili | |
| 6,993,659 B2 | 1/2006 | Milgramm et al. | |
| 7,007,174 B2 | 2/2006 | Wheeler et al. | |
| 7,028,052 B2 | 4/2006 | Chapman et al. | |
| 7,035,855 B1 | 4/2006 | Kilger et al. | |
| 7,069,240 B2 | 6/2006 | Spero et al. | |
| 7,083,090 B2 | 8/2006 | Zuili | |
| 7,089,592 B2 | 8/2006 | Adjaoute et al. | |
| 7,092,891 B2 | 8/2006 | Maus et al. | |
| 7,104,444 B2 | 9/2006 | Suzuki | |
| 7,158,622 B2 | 1/2007 | Lawyer et al. | |
| 7,162,640 B2 | 1/2007 | Heath et al. | |
| 7,174,335 B2 | 2/2007 | Kameda | |
| 7,188,078 B2 | 3/2007 | Arnett et al. | |
| 7,203,653 B1 | 4/2007 | McIntosh | |
| 7,212,995 B2 | 5/2007 | Schulkins | |
| 7,222,779 B1 | 5/2007 | Pineda-Sanchez et al. | |
| 7,225,977 B2 | 6/2007 | Davis | |
| 7,234,156 B2 | 6/2007 | French et al. | |
| 7,240,059 B2 | 7/2007 | Bayliss et al. | |
| 7,240,363 B1 | 7/2007 | Ellingson | |
| 7,246,067 B2 | 7/2007 | Austin et al. | |
| 7,246,740 B2 | 7/2007 | Swift et al. | |
| 7,254,560 B2 | 8/2007 | Singhal | |
| 7,263,506 B2 | 8/2007 | Lee et al. | |
| 7,272,728 B2 | 9/2007 | Pierson et al. | |
| 7,272,857 B1 | 9/2007 | Everhart | |
| 7,277,869 B2 | 10/2007 | Starkman | |
| 7,277,875 B2 | 10/2007 | Serrano-Morales et al. | |
| 7,283,974 B2 | 10/2007 | Katz et al. | |
| 7,289,607 B2 | 10/2007 | Bhargava et al. | |
| 7,290,704 B1 | 11/2007 | Ball et al. | |
| 7,298,873 B2 | 11/2007 | Miller, Jr. et al. | |
| 7,310,743 B1 | 12/2007 | Gagne et al. | |
| 7,314,162 B2 | 1/2008 | Carr et al. | |
| 7,314,167 B1 | 1/2008 | Kiliccote | |
| 7,330,871 B2 | 2/2008 | Barber | |
| 7,333,635 B2 | 2/2008 | Tsantes et al. | |
| 7,340,042 B2 | 3/2008 | Cluff et al. | |

(56) References Cited

U.S. PATENT DOCUMENTS

| | | | |
|---|---|---|---|
| 7,343,149 | B2 | 3/2008 | Benco |
| 7,356,516 | B2 | 4/2008 | Richey et al. |
| 7,370,044 | B2 | 5/2008 | Mulhern et al. |
| 7,370,351 | B1 | 5/2008 | Ramachandran et al. |
| 7,376,618 | B1 | 5/2008 | Anderson et al. |
| 7,383,227 | B2 | 6/2008 | Weinflash et al. |
| 7,386,448 | B1 | 6/2008 | Poss et al. |
| 7,386,506 | B2 | 6/2008 | Aoki et al. |
| 7,392,534 | B2 | 6/2008 | Lu et al. |
| 7,395,273 | B2 | 7/2008 | Khan et al. |
| 7,398,915 | B1 | 7/2008 | Pineda-Sanchez et al. |
| 7,406,715 | B2 | 7/2008 | Clapper |
| 7,412,228 | B2 | 8/2008 | Barclay et al. |
| 7,418,431 | B1 | 8/2008 | Nies et al. |
| 7,428,509 | B2 | 9/2008 | Klebanoff |
| 7,433,855 | B2 | 10/2008 | Gavan et al. |
| 7,433,864 | B2 | 10/2008 | Malik |
| 7,438,226 | B2 | 10/2008 | Helsper et al. |
| 7,444,518 | B1 | 10/2008 | Dharmarajan et al. |
| 7,457,401 | B2 | 11/2008 | Lawyer et al. |
| 7,458,508 | B1 | 12/2008 | Shao et al. |
| 7,466,235 | B1 | 12/2008 | Kolb et al. |
| 7,467,401 | B2 | 12/2008 | Cicchitto |
| 7,480,631 | B1 | 1/2009 | Merced et al. |
| 7,481,363 | B2 | 1/2009 | Zuili |
| 7,490,052 | B2 | 2/2009 | Kilger et al. |
| 7,490,356 | B2 | 2/2009 | Lieblich et al. |
| 7,497,374 | B2 | 3/2009 | Helsper et al. |
| 7,509,117 | B2 | 3/2009 | Yum |
| 7,512,221 | B2 | 3/2009 | Toms |
| 7,519,558 | B2 | 4/2009 | Ballard et al. |
| 7,522,060 | B1 | 4/2009 | Tumperi et al. |
| 7,533,808 | B2 | 5/2009 | Song et al. |
| 7,536,346 | B2 | 5/2009 | Aliffi et al. |
| 7,540,021 | B2 | 5/2009 | Page |
| 7,542,993 | B2 | 6/2009 | Satterfield et al. |
| 7,543,739 | B2 | 6/2009 | Brown et al. |
| 7,543,740 | B2 | 6/2009 | Greene et al. |
| 7,546,271 | B1 | 6/2009 | Chmielewski et al. |
| 7,548,886 | B2 | 6/2009 | Kirkland et al. |
| 7,552,467 | B2 | 6/2009 | Lindsay |
| 7,562,184 | B2 | 7/2009 | Henmi et al. |
| 7,562,814 | B1 | 7/2009 | Shao et al. |
| 7,568,616 | B2 | 8/2009 | Zuili |
| 7,575,157 | B2 | 8/2009 | Barnhardt et al. |
| 7,580,884 | B2 | 8/2009 | Cook |
| 7,581,112 | B2 | 8/2009 | Brown et al. |
| 7,584,146 | B1 | 9/2009 | Duhon |
| 7,587,368 | B2 | 9/2009 | Felsher |
| 7,591,425 | B1 | 9/2009 | Zuili et al. |
| 7,593,891 | B2 | 9/2009 | Kornegay et al. |
| 7,606,401 | B2 | 10/2009 | Hoffman et al. |
| 7,606,790 | B2 | 10/2009 | Levy |
| 7,610,216 | B1 | 10/2009 | May et al. |
| 7,610,229 | B1 | 10/2009 | Kornegay |
| 7,610,243 | B2 | 10/2009 | Haggerty et al. |
| 7,620,596 | B2 | 11/2009 | Knudson et al. |
| 7,623,844 | B2 | 11/2009 | Herrmann et al. |
| 7,630,924 | B1 | 12/2009 | Collins et al. |
| 7,630,932 | B2 | 12/2009 | Danaher et al. |
| 7,636,853 | B2 | 12/2009 | Cluts et al. |
| 7,644,868 | B2 | 1/2010 | Hare |
| 7,647,344 | B2 | 1/2010 | Skurtovich, Jr. et al. |
| 7,647,645 | B2 | 1/2010 | Edeki et al. |
| 7,653,593 | B2 | 1/2010 | Zarikian et al. |
| 7,657,431 | B2 | 2/2010 | Hayakawa |
| 7,668,769 | B2 | 2/2010 | Baker et al. |
| 7,668,840 | B2 | 2/2010 | Bayliss et al. |
| 7,668,921 | B2 | 2/2010 | Proux et al. |
| 7,672,865 | B2 | 3/2010 | Kumar et al. |
| 7,673,793 | B2 | 3/2010 | Greene et al. |
| 7,676,418 | B1 | 3/2010 | Chung et al. |
| 7,676,433 | B1 | 3/2010 | Ross et al. |
| 7,685,096 | B2 | 3/2010 | Margolus et al. |
| 7,686,214 | B1 | 3/2010 | Shao et al. |
| 7,689,007 | B2 | 3/2010 | Bous et al. |
| 7,689,505 | B2 | 3/2010 | Kasower |
| 7,689,506 | B2 | 3/2010 | Fei et al. |
| 7,690,032 | B1 | 3/2010 | Peirce |
| 7,701,364 | B1 | 4/2010 | Zilberman |
| 7,702,550 | B2 | 4/2010 | Perg et al. |
| 7,707,163 | B2 | 4/2010 | Anzalone et al. |
| 7,708,190 | B2 | 5/2010 | Brandt et al. |
| 7,708,200 | B2 | 5/2010 | Helsper et al. |
| 7,711,635 | B2 | 5/2010 | Steele et al. |
| 7,711,636 | B2 | 5/2010 | Robida et al. |
| 7,720,750 | B2 | 5/2010 | Brody |
| 7,725,300 | B2 | 5/2010 | Pinto et al. |
| 7,734,523 | B1 | 6/2010 | Cui et al. |
| 7,735,125 | B1 | 6/2010 | Alvarez et al. |
| 7,742,982 | B2 | 6/2010 | Chaudhuri et al. |
| 7,747,520 | B2 | 6/2010 | Livermore et al. |
| 7,747,521 | B2 | 6/2010 | Serio |
| 7,747,559 | B2 | 6/2010 | Leitner et al. |
| 7,752,084 | B2 | 7/2010 | Pettitt |
| 7,752,236 | B2 | 7/2010 | Williams et al. |
| 7,752,554 | B2 | 7/2010 | Biggs et al. |
| 7,756,783 | B2 | 7/2010 | Crooks |
| 7,761,379 | B2 | 7/2010 | Zoldi et al. |
| 7,761,384 | B2 | 7/2010 | Madhogarhia |
| 7,774,270 | B1 | 8/2010 | MacCloskey |
| 7,778,885 | B1 | 8/2010 | Semprevivo et al. |
| 7,779,456 | B2 | 8/2010 | Dennis et al. |
| 7,779,457 | B2 | 8/2010 | Taylor |
| 7,783,281 | B1 | 8/2010 | Cook et al. |
| 7,783,515 | B1 | 8/2010 | Kumar et al. |
| 7,788,184 | B2 | 8/2010 | Kane |
| 7,792,715 | B1 | 9/2010 | Kasower |
| 7,792,864 | B1 | 9/2010 | Rice et al. |
| 7,793,835 | B1 | 9/2010 | Coggeshall et al. |
| 7,801,811 | B1 | 9/2010 | Merrell et al. |
| 7,801,828 | B2 | 9/2010 | Candella et al. |
| 7,802,104 | B2 | 9/2010 | Dickinson |
| 7,805,362 | B1 | 9/2010 | Merrell et al. |
| 7,805,391 | B2 | 9/2010 | Friedlander et al. |
| 7,809,797 | B2 | 10/2010 | Cooley et al. |
| 7,813,944 | B1 | 10/2010 | Luk et al. |
| 7,827,115 | B2 | 11/2010 | Weller et al. |
| 7,832,006 | B2 | 11/2010 | Chen et al. |
| 7,835,983 | B2 | 11/2010 | Lefner et al. |
| 7,840,459 | B1 | 11/2010 | Loftesness et al. |
| 7,841,004 | B1 | 11/2010 | Balducci et al. |
| 7,844,520 | B1 | 11/2010 | Franklin |
| 7,848,987 | B2 | 12/2010 | Haig |
| 7,849,029 | B2 | 12/2010 | Crooks et al. |
| 7,853,518 | B2 | 12/2010 | Cagan |
| 7,853,526 | B2 | 12/2010 | Milana |
| 7,853,533 | B2 | 12/2010 | Eisen |
| 7,853,998 | B2 | 12/2010 | Blaisdell et al. |
| 7,856,397 | B2 | 12/2010 | Whipple et al. |
| 7,856,494 | B2 | 12/2010 | Kulkarni |
| 7,860,769 | B2 | 12/2010 | Benson |
| 7,860,783 | B2 | 12/2010 | Yang et al. |
| 7,865,427 | B2 | 1/2011 | Wright et al. |
| 7,865,439 | B2 | 1/2011 | Seifert et al. |
| 7,865,937 | B1 | 1/2011 | White et al. |
| 7,870,078 | B2 | 1/2011 | Clark et al. |
| 7,870,599 | B2 | 1/2011 | Pemmaraju |
| 7,873,382 | B2 | 1/2011 | Rydgren et al. |
| 7,873,566 | B1 | 1/2011 | Templeton et al. |
| 7,874,488 | B2 | 1/2011 | Parkinson |
| 7,877,304 | B1 | 1/2011 | Coulter |
| 7,877,784 | B2 | 1/2011 | Chow et al. |
| 7,882,548 | B2 | 2/2011 | Heath et al. |
| 7,890,433 | B2 | 2/2011 | Singhal |
| 7,904,360 | B2 | 3/2011 | Evans |
| 7,904,367 | B2 | 3/2011 | Chung et al. |
| 7,908,242 | B1 | 3/2011 | Achanta |
| 7,909,246 | B2 | 3/2011 | Hogg et al. |
| 7,912,865 | B2 | 3/2011 | Akerman et al. |
| 7,917,715 | B2 | 3/2011 | Tallman, Jr. |
| 7,925,582 | B1 | 4/2011 | Kornegay et al. |
| 7,929,951 | B2 | 4/2011 | Stevens et al. |
| 7,933,835 | B2 | 4/2011 | Keane et al. |

(56) References Cited

U.S. PATENT DOCUMENTS

| | | |
|---|---|---|
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,073,785 B1 | 12/2011 | Candella et al. |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,204,982 B2 | 6/2012 | Casado et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,255,978 B2 | 8/2012 | Dick |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,463,904 B2 | 6/2013 | Casado et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,626,671 B2 | 1/2014 | Federgreen |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,707,445 B2 | 4/2014 | Sher-Jan et al. |
| 8,725,613 B1 | 5/2014 | Celka et al. |
| 8,763,133 B2 | 6/2014 | Sher-Jan et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,147,117 B1 | 9/2015 | Madhu et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,210,156 B1 | 12/2015 | Little et al. |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,483,650 B2 | 11/2016 | Sher-Jan et al. |
| 9,489,497 B2 | 11/2016 | MaGill et al. |
| 9,531,738 B2 | 12/2016 | Zoldi et al. |
| 9,558,368 B2 | 1/2017 | Gottschalk, Jr. et al. |

(56) References Cited

U.S. PATENT DOCUMENTS

| | | |
|---|---|---|
| 9,595,066 B2 | 3/2017 | Samler et al. |
| 9,600,845 B2 | 3/2017 | Nordyke et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,773,227 B2 | 9/2017 | Zoldi et al. |
| 9,781,147 B2 | 10/2017 | Sher-Jan et al. |
| 9,805,216 B2 | 10/2017 | Kraska et al. |
| 9,953,321 B2 | 4/2018 | Zoldi et al. |
| 10,043,213 B2 | 8/2018 | Straub et al. |
| 10,089,411 B2 | 10/2018 | Kassa |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,404,472 B2 | 9/2019 | Knopf |
| 10,430,604 B2 | 10/2019 | Spinelli et al. |
| 10,438,308 B2 | 10/2019 | Prichard et al. |
| 10,482,542 B1 | 11/2019 | Jain |
| 10,497,034 B2 | 12/2019 | Yang et al. |
| 10,510,025 B2 | 12/2019 | Zoldi et al. |
| 10,521,857 B1 | 12/2019 | Shao et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 10,616,196 B1 | 4/2020 | Khitrenovich et al. |
| 10,692,058 B2 | 6/2020 | Zoldi et al. |
| 10,699,028 B1 | 6/2020 | Kennedy et al. |
| 10,713,711 B2 | 7/2020 | Zoldi |
| 10,769,290 B2 | 9/2020 | Crawford et al. |
| 10,791,136 B2 | 9/2020 | Zoldi et al. |
| 10,896,381 B2 | 1/2021 | Zoldi et al. |
| 10,896,472 B1 | 1/2021 | Stack et al. |
| 10,902,426 B2 | 1/2021 | Zoldi et al. |
| 10,909,617 B2 | 2/2021 | Kasower |
| 10,958,725 B2 | 3/2021 | Knopf |
| 10,977,363 B2 | 4/2021 | Leitner et al. |
| 10,990,979 B1 | 4/2021 | Coleman et al. |
| 10,999,298 B2 | 5/2021 | Eisen |
| 11,023,963 B2 | 6/2021 | Zoldi et al. |
| 11,025,428 B2 | 6/2021 | Knopf |
| 11,030,562 B1 | 6/2021 | Dean et al. |
| 11,037,229 B2 | 6/2021 | Zoldi et al. |
| 11,080,740 B2 | 8/2021 | Billman et al. |
| 11,087,334 B1 | 8/2021 | McEachern et al. |
| 11,093,845 B2 | 8/2021 | Zoldi et al. |
| 11,093,988 B2 | 8/2021 | Zoldi et al. |
| 11,100,506 B2 | 8/2021 | Zoldi et al. |
| 11,108,562 B2 | 8/2021 | Knopf et al. |
| 11,151,468 B1 | 10/2021 | Chen et al. |
| 11,157,650 B1 | 10/2021 | Kennedy et al. |
| 11,256,825 B2 | 2/2022 | Spinelli et al. |
| 11,354,670 B2 | 6/2022 | Phelan et al. |
| 11,367,074 B2 | 6/2022 | Zoldi et al. |
| 11,373,190 B2 | 6/2022 | Zoldi et al. |
| 11,380,171 B2 | 7/2022 | Chen et al. |
| 11,423,414 B2 | 8/2022 | Zoldi et al. |
| 11,431,736 B2 | 8/2022 | Brown et al. |
| 11,436,606 B1 | 9/2022 | Coleman et al. |
| 11,552,901 B2 | 1/2023 | Hoover et al. |
| 11,568,348 B1 | 1/2023 | Dean et al. |
| 11,580,259 B1 | 2/2023 | Kennedy et al. |
| 11,593,476 B2 | 2/2023 | Van Dyke |
| 11,625,730 B2 | 4/2023 | Liu et al. |
| 11,658,994 B2 | 5/2023 | Johnston et al. |
| 11,665,004 B2 | 5/2023 | Knopf |
| 11,669,894 B2 | 6/2023 | Nordyke et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |

(56) References Cited

U.S. PATENT DOCUMENTS

| | | |
|---|---|---|
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0205008 A1 | 10/2004 | Haynie et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0039086 A1 | 2/2005 | Krishnamurthy et al. |
| 2005/0050577 A1 | 3/2005 | Westbrook et al. |
| 2005/0058262 A1 | 3/2005 | Timmins et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0273442 A1 | 12/2005 | Bennett et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0161592 A1 | 7/2006 | Ertoz et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0287902 A1 | 12/2006 | Helsper et al. |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |

(56) References Cited

U.S. PATENT DOCUMENTS

| | | |
|---|---|---|
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallmar |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0086759 A1 | 4/2008 | Colson |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0140576 A1 | 6/2008 | Lewis et al. |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162259 A1 | 7/2008 | Patil et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106150 A1 | 4/2009 | Pelegero et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |

(56) References Cited

U.S. PATENT DOCUMENTS

| | | |
|---|---|---|
| 2009/0199264 A1 | 8/2009 | Lang |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0216747 A1 | 8/2009 | Li et al. |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0280882 A1* | 11/2010 | Faith ............... G06Q 40/12 705/7.37 |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0131123 A1 | 6/2011 | Griffin et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0036352 A1 | 2/2012 | Tovar et al. |
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0278249 A1 | 11/2012 | Duggal et al. |
| 2012/0290660 A1 | 11/2012 | Rao et al. |
| 2013/0004033 A1 | 1/2013 | Trugenberger et al. |
| 2013/0132060 A1 | 5/2013 | Badhe et al. |
| 2013/0185293 A1 | 7/2013 | Boback |

(56) References Cited

U.S. PATENT DOCUMENTS

| | | |
|---|---|---|
| 2013/0218797 A1 | 8/2013 | Prichard et al. |
| 2014/0007238 A1 | 1/2014 | Magee et al. |
| 2014/0058910 A1 | 2/2014 | Abeles |
| 2014/0149304 A1 | 5/2014 | Bucholz et al. |
| 2014/0214636 A1 | 7/2014 | Rajsky |
| 2014/0283097 A1 | 9/2014 | Allen et al. |
| 2014/0304822 A1 | 10/2014 | Sher-Jan et al. |
| 2015/0106260 A1 | 4/2015 | Andrews et al. |
| 2015/0142595 A1 | 5/2015 | Acuña-Rohter |
| 2015/0161529 A1 | 6/2015 | Kondaji et al. |
| 2015/0186901 A1 | 7/2015 | Miltonberger |
| 2015/0199784 A1 | 7/2015 | Straub et al. |
| 2015/0205692 A1* | 7/2015 | Seto .................. G06F 11/3452 702/182 |
| 2015/0295924 A1 | 10/2015 | Gottschalk, Jr. |
| 2015/0348036 A1 | 12/2015 | Nordyke et al. |
| 2015/0348208 A1 | 12/2015 | Nordyke et al. |
| 2016/0012561 A1 | 1/2016 | Lappenbusch et al. |
| 2016/0063278 A1 | 3/2016 | Kraska et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0142532 A1 | 5/2016 | Bostick |
| 2016/0210450 A1 | 7/2016 | Su |
| 2016/0328814 A1 | 11/2016 | Prichard et al. |
| 2016/0344758 A1 | 11/2016 | Cohen et al. |
| 2016/0379011 A1 | 12/2016 | Koike et al. |
| 2017/0099314 A1 | 4/2017 | Klatt et al. |
| 2017/0177683 A1 | 6/2017 | Koike et al. |
| 2017/0206376 A1 | 7/2017 | Sher-Jan |
| 2017/0270629 A1 | 9/2017 | Fitzgerald |
| 2017/0278182 A1 | 9/2017 | Kasower |
| 2017/0287065 A1 | 10/2017 | Samler et al. |
| 2017/0357971 A1 | 12/2017 | Pitz et al. |
| 2017/0374076 A1 | 12/2017 | Pierson et al. |
| 2018/0004978 A1 | 1/2018 | Hebert et al. |
| 2018/0013786 A1 | 1/2018 | Knopf |
| 2018/0033009 A1 | 2/2018 | Goldman et al. |
| 2018/0130157 A1 | 5/2018 | Gottschalk, Jr. et al. |
| 2018/0184288 A1 | 6/2018 | De Lorenzo et al. |
| 2018/0322572 A1 | 11/2018 | Straub et al. |
| 2019/0073676 A1 | 3/2019 | Wang |
| 2019/0164173 A1 | 5/2019 | Liu et al. |
| 2019/0228178 A1 | 7/2019 | Sharma et al. |
| 2019/0266609 A1 | 8/2019 | Phelan et al. |
| 2019/0294786 A1 | 9/2019 | Villavicencio et al. |
| 2019/0311366 A1 | 10/2019 | Zoldi et al. |
| 2019/0333101 A1 | 10/2019 | Sohum et al. |
| 2019/0349351 A1 | 11/2019 | Verma et al. |
| 2019/0377896 A1 | 12/2019 | Spinelli et al. |
| 2020/0134629 A1 | 4/2020 | Zoldi et al. |
| 2020/0143465 A1 | 5/2020 | Chilaka et al. |
| 2020/0145436 A1 | 5/2020 | Brown et al. |
| 2020/0151628 A1 | 5/2020 | Zoldi et al. |
| 2020/0193018 A1 | 6/2020 | Van Dyke |
| 2020/0219181 A1 | 7/2020 | Kasower |
| 2020/0242615 A1 | 7/2020 | Chandra et al. |
| 2020/0273097 A1 | 8/2020 | Nordyke et al. |
| 2020/0293684 A1 | 9/2020 | Harris et al. |
| 2020/0380112 A1 | 12/2020 | Allen |
| 2020/0396246 A1 | 12/2020 | Zoldi et al. |
| 2021/0021631 A1 | 1/2021 | Okutan et al. |
| 2021/0150532 A1 | 5/2021 | Zhang et al. |
| 2021/0209230 A1 | 7/2021 | Leitner et al. |
| 2021/0326785 A1 | 10/2021 | McBurnett et al. |
| 2021/0372314 A1 | 12/2021 | Weigl et al. |
| 2022/0038481 A1 | 2/2022 | Jones |
| 2022/0046088 A1 | 2/2022 | Knopf |
| 2022/0084032 A1 | 3/2022 | Koehler et al. |
| 2022/0103589 A1 | 3/2022 | Shen et al. |
| 2022/0123946 A1 | 4/2022 | Knopf |
| 2022/0147817 A1 | 5/2022 | Boardman et al. |
| 2022/0207324 A1 | 6/2022 | Hamilton et al. |
| 2022/0231859 A1 | 7/2022 | Knopf et al. |
| 2022/0277308 A1 | 9/2022 | Ardizzi et al. |
| 2022/0321394 A1 | 10/2022 | Huang et al. |
| 2022/0327541 A1 | 10/2022 | Seguritan |
| 2022/0358516 A1 | 11/2022 | Zoldi et al. |
| 2022/0368704 A1 | 11/2022 | Brown et al. |
| 2022/0377096 A1 | 11/2022 | Johnston et al. |
| 2022/0391793 A1 | 12/2022 | Latimer et al. |
| 2022/0400087 A1 | 12/2022 | Hoover et al. |
| 2022/0417275 A1 | 12/2022 | Jones |
| 2023/0035336 A1 | 2/2023 | Knopf |
| 2023/0046601 A1 | 2/2023 | Hamilton et al. |
| 2023/0082708 A1 | 3/2023 | Hoover et al. |
| 2023/0113118 A1 | 4/2023 | Guo et al. |
| 2023/0196147 A1 | 6/2023 | McBurnett et al. |
| 2023/0196455 A1 | 6/2023 | Huber et al. |
| 2023/0205893 A1 | 6/2023 | Gjorvad et al. |
| 2023/0216866 A1 | 7/2023 | Monnig et al. |
| 2023/0229767 A1 | 7/2023 | Galli et al. |
| 2023/0245246 A1 | 8/2023 | Stack et al. |

FOREIGN PATENT DOCUMENTS

| | | |
|---|---|---|
| CN | 104877993 | 9/2015 |
| CN | 113011973 | 6/2021 |
| DE | 91 08 341 | 10/1991 |
| EP | 0 554 083 | 8/1993 |
| EP | 2 939 361 | 10/2019 |
| GB | 2 392 748 | 3/2004 |
| GB | 2 518 099 | 3/2015 |
| JP | 2011-134252 | 7/2011 |
| JP | 5191376 | 5/2013 |
| KR | 10-2004-0034063 | 4/2004 |
| TW | I256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2007/106393 | 9/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2015/184006 | 12/2015 |
| WO | WO 2018/175440 | 9/2018 |
| WO | WO 2018/208770 | 11/2018 |
| WO | WO 2019/006272 | 1/2019 |
| WO | WO 2019/040443 | 2/2019 |
| WO | WO 2019/050864 | 3/2019 |
| WO | WO 2019/079071 | 4/2019 |
| WO | WO 2019/125445 | 6/2019 |
| WO | WO 2019/169000 | 9/2019 |
| WO | WO 2022/020162 | 1/2022 |
| WO | WO 2022/026273 | 2/2022 |
| WO | WO 2022/031412 | 2/2022 |
| WO | WO 2022/032285 | 2/2022 |
| WO | WO 2022/072989 | 4/2022 |
| WO | WO 2022/221202 | 10/2022 |

(56) References Cited

FOREIGN PATENT DOCUMENTS

| WO | WO 2023/060150 | 4/2023 |
|---|---|---|
| WO | WO 2023/129977 | 7/2023 |

OTHER PUBLICATIONS

Sun et al. "Enhancing Security Using Mobility-Based Anomaly Detection in Cellular Mobile Networks", Jul. 2006, IEEE Transactions on Vehicular Technology, vol. 55, No. 4.*

Kundu et al. "BLAST-SSAHA Hybridization for Credit Card Fraud Detection", 2009, IEEE Transactions on Dependable and Secure Computing, vol. 6, No. 4.*

Ye et al., "EWMA Forecast of Normal System Activity for Computer Intrusion Detection", 2004, IEEE Transactions on Reliability, vol. 53, No. 4.*

U.S. Appl. No. 15/199,291, U.S. Pat. No. 11,151,468, Behavior Analysis Using Distributed Representations of Event Data, Jun. 30, 2016.

U.S. Appl. No. 09/557,252, filed Apr. 24, 2000, Page.

U.S. Appl. No. 12/705,489, filed Feb. 12, 2010, Bargoli et al.

U.S. Appl. No. 12/705,511, filed Feb. 12, 2010, Bargoli et al.

Aïmeur et al., "The Scourge of Internet Personal Data Collection", 2013 International Conference on Availability, Reliability and Security, pp. 821-828.

Dimopoulou et al., "Mobile Anonymization and Pseudonymization of Structured Health Data for Research," 2022 Seventh International Conference on Mobile and Secure Services (MobiSecServ), 2022, pp. 1-6.

El Haddad et al., "Exploring User Behavior and Cybersecurity Knowledge—An Experimental Study in Online Shopping", 2018 16th Annual Conference on Privacy, Security and Trust (PST), pp. 10.

Gaudio, David, "Intelligent Adaptive Authentication: How 6 Workflow Steps Improve Customer Experience", OneSpan, https://www.onespan.com/blog/intelligent-adaptive-authentication-how-6-workflow-steps-improve-customer-experience, Jun. 22, 2020, pp. 6.

Lennox et al., "Tax Aggressiveness and Accounting Fraud", Journal of Accounting Research, 2013, pp. 40.

Pervushin et al., "Determination of loss of information during data anonymization procedure," 2016 IEEE 10th International Conference on Application of Information and Communication Technologies (AICT), 2016, pp. 1-5.

Torgler, Benno, "What Do We Know about Tax Fraud?: An Overview of Recent Developments", Social Research: An International Quarterly, vol. 74, No. 4, Winter 2008, pp. 1239-1270.

Trivedi et al., "Parallel Data Stream Anonymization Methods: A Review," 2022 Second International Conference on Artificial Intelligence and Smart Energy (ICAIS), 2022, pp. 887-891.

International Search Report and Written Opinion for Application No. PCT/US2022/024277, dated Jul. 18, 2022.

"A New Approach to Fraud Solutions", BasePoint Science Solving Fraud, pp. 8, 2006.

Aad et al., "NRC Data Collection and the Privacy by Design Principles", IEEE, Nov. 2010, pp. 5.

Allard et al., "Safe Realization of the Generalization Privacy Mechanism", 2011 Ninth Annual International Conference on Privacy, Security and Trust, pp. 8.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.

ABC News Now:Money Matters, as broadcasted Nov. 15, 2005 with guest Todd Davis (CEO of Lifelock), pp. 6.

AlSalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.

Anonymous, "Feedback", Credit Management, ABI/Inform Global, Sep. 2006, pp. 6.

"Beverly Hills Man Convicted of Operating 'Bust-Out' Schemes that Caused More than $8 Million in Losses", Department of Justice, Jul. 25, 2006, 2 Pgs.

Bielski, Lauren, "Will you Spend to Thwart ID Theft?" ABA Banking Journal, Apr. 2005, pp. 54, 56-57, 60.

BlueCava, "What We Do", http://www.bluecava.com/what-we-do/, printed Nov. 5, 2012 in 3 pages.

"Bust-Out Schemes", Visual Analytics Inc. Technical Product Support, Newsletter vol. 4, Issue 1, Jan. 2005, pp. 7.

Chores & Allowances, "Do Kids Have Credit Reports?" Oct. 15, 2007, http://choresandallowances.blogspot.com/2007/10/do-kids-have-credit-reports.html, pp. 5.

Cowie, Norman, "Warning Bells & 'The Bust-Out'", Business Credit, Jul. 1, 2000, pp. 5.

Cullen, Terri; "The Wall Street Journal Complete Identity Theft Guidebook:How to Protect Yourself from the Most Pervasive Crime in America"; Chapter 3, pp. 59-79; Jul. 10, 2007.

"Data Loss Prevention (DLP) Software", http://www.symantec.com/data-loss-prevention/ printed Apr. 8, 2013 in 8 pages.

"Data Protection", http://compliantprocessing.com/data-protection/ printed Apr. 8, 2013 in 4 pages.

Day, Jo and Kevin; "ID-ology: A Planner's Guide to Identity Theft"; Journal of Financial Planning:Tech Talk; pp. 36-38; Sep. 2004.

"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.

EFunds Corporation, "Data & Decisioning: Debit Report" printed Apr. 1, 2007, http://www.efunds.com/web/industry-solutions/financial-services/frm-debit-report/htm in 1 page.

El Kalam et al., "Personal Data Anonymization for Security and Privacy in Collaborative Environments", 2005 IEEE, pp. 56-61.

Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.

Experian Team, "Impact on Credit Scores of Inquiries for an Auto Loan," Ask Experian, Mar. 1, 2009, pp. 5.

"Fair Isaac Introduces Falcon One System to Combat Fraud at Every Customer Interaction", Business Wire, May 5, 2005, pp. 3.

"Fair Isaac Offers New Fraud Tool", National Mortgage News & Source Media, Inc., Jun. 13, 2005, pp. 2.

FamilySecure.com, "Frequently Asked Questions", http://www.familysecure.com/FAQ.aspx as archived Jul. 15, 2007 in 3 pages.

FamilySecure.com; "Identity Theft Protection for the Whole Family | FamilySecure.com" http://www.familysecure.com/, as retrieved on Nov. 5, 2009.

"Fighting the New Face of Fraud", FinanceTech, http://www.financetech.com/showArticle.jhtml?articleID=167100405, Aug. 2, 2005.

"FinExtra, Basepoint Analytics Introduces Predictive Technology for Mortgage Fraud", Oct. 5, 2005, pp. 3.

Fisher, Joseph, "Access to Fair Credit Reports: Current Practices and Proposed Legislation," American Business Law Journal, Fall 1981, vol. 19, No. 3, p. 319.

"Fraud Alert | Learn How". Fight Identity Theft. http://www.fightidentitytheft.com/flag.html, accessed on Nov. 5, 2009.

Gibbs, Adrienne; "Protecting Your Children from Identity Theft," Nov. 25, 2008, http://www.creditcards.com/credit-card-news/identity-ID-theft-and-kids-children-1282.php, pp. 4.

"GLBA Compliance and FFIEC Compliance" http://www.trustwave.com/financial-services.php printed Apr. 8, 2013 in 1 page.

Gordon et al., "Identity Fraud: A Critical National and Global Threat," LexisNexis, Oct. 28, 2003, pp. 1-48.

Haglund, Christoffer, "Two-Factor Authentication with a Mobile Phone", Fox Technologies, Uppsala, Department of Information Technology, Nov. 2, 2007, pp. 62.

Herzberg, Amir, "Payments and Banking with Mobile Personal Devices," Communications of the ACM, May 2003, vol. 46, No. 5, pp. 53-58.

(56) References Cited

OTHER PUBLICATIONS

"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jaeger, Herbert, "A Tutorial on Training Recurrent Neural Networks, Covering BPPT, RTRL, EKF and the 'Echo State Network' Approach", Fraunhofer Institute for Autonomous Intelligent Systems (AIS), International University Bremen, Oct. 2002, pp. 46.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.
"Recurrent Neural Network", as downloaded from wikipedia.org <https://en.wikipedia.org/wiki/Recurrent_neural_network?oldid=717224329>, Apr. 2016, pp. 8.
Ribeiro et al., "Privacy Protection with Pseudonumization and Anonumization in a Health IoT System", Results from OCARIoT, 2019 IEEE, pp. 904-908.
Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.

(56) References Cited

OTHER PUBLICATIONS

ShoeBoxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.
TheMorningCall.Com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, mailed Dec. 10, 2009.
International Search Report and Written Opinion for Application No. PCT/US09/37565, dated May 12, 2009.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.
Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.
Extended European Search Report for Application No. EP18748000, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2011/033940, dated Aug. 22, 2011.

\* cited by examiner

BEHAVIOR ANALYSIS USING DISTRIBUTED REPRESENTATIONS OF EVENT DATA

CROSS-REFERENCE TO RELATED APPLICATIONS

This application claims priority to U.S. application Ser. No. 15/199,291, filed Jun. 30, 2016, which claims priority to U.S. Provisional Application No. 62/188,252, filed Jul. 2, 2015, each of which is hereby incorporated by reference in its entirety. Any and all priority claims identified in an Application Data Sheet are hereby incorporated by reference under 37 C.F.R. § 1.57.

BACKGROUND

Field

The present developments relate to artificial intelligence systems and methods, specifically to predictive systems and methods for fraud risk, and behavior-based marketing using distributed representations of event data.

Description of Related Art

With the advent of modern computing devices, the ways in which users use electronic devices to interact with various entities has dramatically increased. Each event a user performs, whether by making a small purchasing at a grocery store, logging into a web-site, checking a book out of a library, driving a car, making a phone call, or exercising at the gym, the digital foot print of the users interactions can be tracked. The quantity of event data collected for just one user can be immense. The enormity of the data may be compounded by the number of users connected and the increasing number of event types that are made possible through an increasing number of event sources and entities.

Accordingly, improved systems, devices, and methods for accurately and efficiently identifying fraud risk based on event data are desirable.

SUMMARY

The features relate to artificial intelligence directed detection of user behavior based on complex analysis of user event data including language modeling to generate distributed representations of user behavior. Further features are described for reducing the amount of data needed to represent relationships between events such as transaction events received from card readers or point of sale systems. Machine learning features for dynamically determining an optimal set of attributes to use as the language model as well as for comparing current event data to historical event data are also included.

The systems, methods, and devices of the disclosure each have several innovative aspects, no single one of which is solely responsible for the desirable attributes disclosed herein.

In one innovative aspect, a computer-implemented method of artificial intelligence guided monitoring of event data is provided. The method includes several steps performed under control of one or more computing devices configured with specific computer-executable instructions. The method includes accessing, from a data store, a sequence of event records associated with a user, the sequence of event records indicating a history of events for the user. The method includes identifying a set of attributes of an event record to represent the event records. The method includes generating a model to provide a vector representing an event included in the history of events using values for the set of attributes of the sequence of event records. A first vector representing a first event at a first time indicates a higher degree of similarity to a second vector representing a second event at a second time than to a third vector representing a third event at a third time. A first difference between the first time and the second time is less than a second difference between the first time and the third time. The method includes receiving, from an event processing device, a candidate event for the user. The method includes generating a candidate event vector using the model and the candidate event. The method includes identifying a behavior anomaly using a degree of similarity between the candidate event vector and a prior event vector representing a prior event. The method includes providing an indication of the behavior anomaly for the candidate event for the user.

In some implementations of the method, identifying the behavior anomaly further may include identifying a set of prior events representing past behavior of the user, the set of prior events including the prior event. The method may include generating the degree of similarity between the candidate event vector and vectors representing the set of prior events. For example, the degree of similarity may be generated using a mean of similarity values between the candidate event vector and the vectors representing the set of prior events. In some implementations, the degree of similarity may be generated using a maximum or a minimum similarity value between the candidate event vector and the vectors representing the set of prior events.

In some implementations, the method includes generating the vectors representing each of the set of prior events. The method may include generating a composite vector for the user based on the vectors representing the set of prior events, and wherein the degree of similarity is generated using an exponentially weighted moving average.

In some implementations, the method includes receiving anomaly indicators for the set of prior events and generating an anomaly model that combines similarity metrics of the set of prior events to generate an output determination for a prior event corresponding to an anomaly indicator for the prior event. The method may further include generating similarity metrics for the candidate event, the similarity metrics indicating degrees of similarity between the candidate event and at least one of the prior events included in the set of prior events, the similarity metrics including the degree of similarity between the candidate event vector and a vector representation of one of prior events included in the set of prior events. The method may also include generating the indication of the behavior anomaly using the similarity metrics and the anomaly model.

In some implementations, the event processing device comprises a card reading device, and receiving the candidate event for the user includes receiving, from the card reading device, an authorization request including the candidate event, and wherein providing the indication of the behavior anomaly comprises providing an authorization response indicating the candidate event is unauthorized.

Some implementations of the method include receiving a third-party behavior score for the user from a third-party behavior scoring system, wherein identifying the behavior anomaly is further based at least in part on the third-party behavior score.

In another innovative aspect, a computer-implemented method of artificial intelligence guided monitoring of event data. The method may be performed under control of one or more computing devices configured with specific computer-executable instructions. The instructions may cause the one or more computing devices to perform the method including receiving, from an event processing device, a candidate event for a user, generating a candidate event vector using a model and the candidate event, identifying a behavior anomaly using a degree of similarity between the candidate event vector and a prior event vector for a prior event, and providing an indication of the behavior anomaly for the candidate event for the user.

Some implementations of the method include accessing, from a data store, a sequence of event records associated with the user, the sequence of event records indicating a history of events for the user, identifying a set of attributes of an event record to represent the event records, and generating a model to provide the vector of the prior event included in the history of events using values for the set of attributes of the sequence of event records. Some implementations of the method include receiving a third-party behavior score for the user from a third-party behavior scoring system, wherein identifying the behavior anomaly is further based at least in part on the third-party behavior score.

Providing the indication of the behavior anomaly may include providing an authorization response indicating a transaction associated with the candidate event is unauthorized, wherein the authorization response causes configuration of the event processing device to acquire additional event information to authorize the candidate event. In some implementations, the authorization response may cause configuration of the event processing device to acquire additional event information to authorize the transaction associated with the candidate event.

In a further innovative aspect, an artificial intelligence event monitoring system is provided. The system includes an electronic data processing device comprising instructions stored on a computer readable medium that, when executed by the electronic data processing device, cause the electronic data processing device to receive, from an event processing device, a candidate event for a user, generate a candidate event vector using a model and the candidate event, identify a behavior anomaly using a degree of similarity between the candidate event vector and a prior event vector for a prior event, and provide an indication of the behavior anomaly for the candidate event for the user.

The computer readable medium may store additional instructions that cause the electronic data processing device to access, from a data store, a sequence of event records associated with the user, the sequence of event records indicating a history of events for the user, identify a set of attributes of an event record to represent the event records, and generate a model to provide the vector of the prior event included in the history of events using values for the set of attributes of the sequence of event records.

In a further innovative aspect, a computer-implemented method of artificial intelligence guided content provisioning is provided. The method includes, under control of one or more computing devices configured with specific computer-executable instructions, accessing, from a data store, a sequence of event records associated with a user, the sequence of event records indicating a history of events for the user. The method includes identifying a set of attributes of an event record to represent the event records. The method includes generating a model to provide a vector representation of an event included in the history of events using values for the set of attributes of the sequence of event records. A first vector representation of a first event at a first time indicates a higher degree of similarity to a second vector representation of a second event at a second time than to a third vector representation of a third event at a third time. The difference between the first time and the second time is less than the difference between the first time and the third time. The method includes receiving a desired event related to a content item to be provided. The method further includes generating a candidate event vector representation for the desired event using the model and the desired event. The method includes identifying an event record having at least a predetermined degree of similarity with the desired event and providing the content item to a user associated with the event record.

DETAILED DESCRIPTION

Disclosed herein are system and methods of analyzing, processing, and manipulating large sets of transaction data of users in order to provide various visualizations, alerts, and other actionable intelligence to control event processing devices, user electronic communication devices and the like as well as to users, merchants, and others. Transaction data may include, for example, data associated with any interaction by a user device with a server, website, database, and/or other online data owned by or under control of a requesting entity, such as a server controlled by a third party. Such events may include access of webpages, submission of information via webpages, accessing a server via a stand-alone application (e.g., an application on a mobile device or desktop computer), login in activity, Internet search history, Internet browsing history, posts to a social media platform, or other interactions between communication devices. In some implementations, the users may be machines interacting with each other (e.g., machine to machine communications). In some embodiments transaction data may include, for example, specific transactions on one or more credit cards of a user, such as the detailed transaction data that is available on credit card statements. Transaction data may include transaction-level debit information also, such as regarding debit card or checking account transactions. The transaction data may be obtained from various sources, such as from credit issuers (e.g., financial institutions that issue credit cards), transaction processors (e.g., entities that process credit card swipes at points of sale), transaction aggregators, merchant retailers, and/or any other source.

Figure 19:
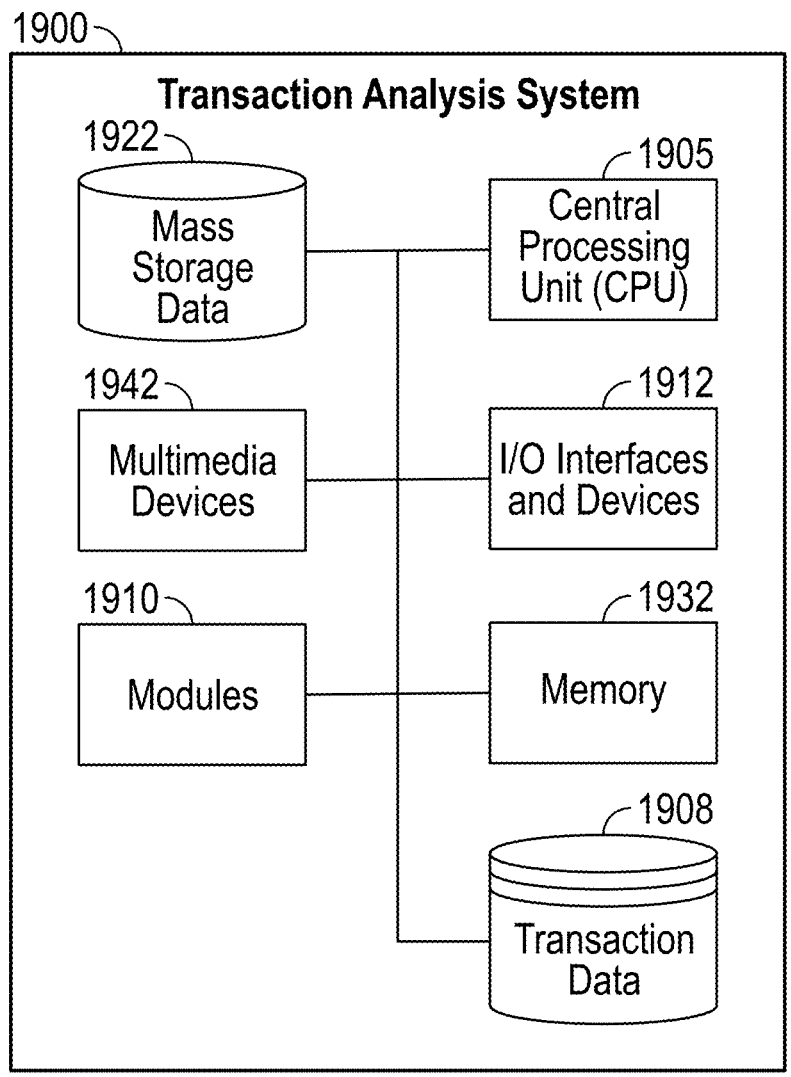
FIG. 19 shows a block diagram showing example components of a transaction analysis computing system 1900.

Each of the processes described herein may be performed by a transaction analysis processing system (also referred to as simply "the system," "the transaction analysis system," or "the processing system" herein), such as the example transaction analysis system illustrated in FIG. 19 and discussed below. In other embodiments, other processing systems, such as systems including additional or fewer components than are illustrated in FIG. 19 may be used to perform the processes. In other embodiments, certain processes are performed by multiple processing systems, such as one or more servers performing certain processes in communication with a user computing device (e.g., mobile device) that performs other processes.

As noted above, in one embodiment the transaction analysis processing system accesses transaction data associated with a plurality of users in order to generate machine learning models that can provide efficient and accurate behavior detection and predictions based on users' transaction data. It may be desirable to detect abnormal behavior (e.g., fraudulent behavior) during a transaction. Such "real-time" data allows transaction participants to receive relevant information at a specific point in time when a potentially abnormal transaction may be further verified or stopped.

Exemplary Definitions

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Transaction data (also referred to as event data) generally refers to data associated with any event, such as an interaction by a user device with a server, website, database, and/or other online data owned by or under control of a requesting entity, such as a server controlled by a third party, such as a merchant. Transaction data may include merchant name, merchant location, merchant category, transaction dollar amount, transaction date, transaction channel (e.g., physical point of sale, Internet, etc.) and/or an indicator as to whether or not the physical payment card (e.g., credit card or debit card) was present for a transaction. Transaction data structures may include, for example, specific transactions on one or more credit cards of a user, such as the detailed transaction data that is available on credit card statements. Transaction data may also include transaction-level debit information, such as regarding debit card or checking account transactions. The transaction data may be obtained from various sources, such as from credit issuers (e.g., financial institutions that issue credit cards), transaction processors (e.g., entities that process credit card swipes at points-of-sale), transaction aggregators, merchant retailers, and/or any other source. Transaction data may also include non-financial exchanges, such as login activity, Internet search history, Internet browsing history, posts to a social media platform, or other interactions between communication devices. In some implementations, the users may be machines interacting with each other (e.g., machine-to-machine communications). Transaction data may be presented in raw form. Raw transaction data generally refers to transaction data as received by the transaction processing system from a third party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as behavior patterns (e.g., spend patterns), data cluster affinity, or the like.

An entity generally refers to one party involved in a transaction. In some implementations, an entity may be a merchant or other provider of goods or services to one or more users A model generally refers to a machine learning construct which may be used by the transaction processing system to automatically generate distributed representations of behavior data and/or similarity metrics between distributed representations. A model may be trained. Training a model generally refers to an automated machine learning process to generate the model that accepts transaction data as an input and provides a distributed representation (e.g., vector) as an output. When comparing distributed representations, the model may identify comparisons between two vectors for generating a similarity score indicating how similar a given vector is to another. A model may be represented as a data structure that identifies, for a given value, one or more correlated values.

A vector encompasses a data structure that can be expressed as an array of values where each value has an assigned position that is associated with another predetermined value. For example, an entity vector will be discussed below. A single entity vector may be used represent the number of transaction for a number of users within a given merchant. Each entry in the entity vector represents the count while the position within the entity vector may be used to identify the user with whom the count is associated. In some implementations, a vector may be a useful way to hide the identity of a user but still provide meaningful analysis of their transaction data. In the case of entity vectors, as long as the system maintains a consistent position for information related to a user within the vectors including user data, analysis without identifying a user can be performed using positional information within the vectors. Other vectors may be implemented wherein the entries are associated with transaction categories or other classes of transaction data.

The term machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as entities, transactions, or transaction categories as will be described in further detail below. Such relationships may include recommendations of entities for a user based on past entities the user has transacted with.

A recommendation encompasses information identified that may be of interest to a user having a particular set of features. For example, a recommendation may be developed for a user based on a collection of transaction data associated with the user and through application of a machine learning process comparing that transaction data with third-party transaction data (e.g., transaction data of a plurality of other users). A recommendation may be based on a determined entity and may include other merchants related to the determined merchant. In some implementations, the recommendation may include recommendation content. The recommendation content may be text, pictures, multimedia, sound, or some combination thereof. The recommendation content may include information related to merchants or categories of merchants identified for a given user. In some implementations, the recommendation may include a recommendation strength. The strength may indicate how closely the recommendation matches user preferences as indicated by the provided transaction data features (e.g., transaction category, number of transaction within a category, date of transaction, etc.). For example, a user may have a very obscure set of features for which there are few recommendations, and of the recommendations that are able to be generated using the models, the strength is lower than a recommendation for another user who has more readily ascertainable features. As such, the strength may be included to allow systems receiving the recommendation to decide how much credence to give the recommendation.

A message encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, a message may be composed, transmitted, stored, received, etc. in multiple parts.

The terms determine or determining encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The term selectively or selective may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

The terms provide or providing encompass a wide variety of actions. For example, "providing" may include storing a value in a location for subsequent retrieval, transmitting a value directly to a recipient, transmitting or storing a reference to a value, and the like. "Providing" may also include encoding, decoding, encrypting, decrypting, validating, verifying, and the like.

A user interface (also referred to as an interactive user interface, a graphical user interface or a UI) may refer to a web-based interface including data fields for receiving input signals or providing electronic information and/or for providing information to the user in response to any received input signals. A UI may be implemented in whole or in part using technologies such as HTML, Flash, Java, .net, web services, and RSS. In some implementations, a UI may be included in a stand-alone client (for example, thick client, fat client) configured to communicate (e.g., send or receive data) in accordance with one or more of the aspects described.

Introduction

This document provides a description of novel systems and methods for detecting abnormal behavior based on transactional data information. The application areas of such methodology can be for fraud detection (users, consumers, merchants, personnel, etc.), targeted marketing (user, consumer, and business), and credit/attrition risk prediction. The transactions can be any type of records describing the activity of users or business. For example, specific transactions on one or more plastic (credit or debit) cards of a user, such as the detailed transaction data that is available on card statements. Other examples include but are not limited to, online web click stream, and mobile phone location/activity. While the example embodiments discussed herein are generally directed toward the use of credit card transactions made by users, the systems and methods disclosed herein are not limited to such embodiments, and may be implemented using a variety of data sources.

Abnormal behavior of credit card transaction usage, may indicate that the credit card is being used by someone who is not an authorized user, thus it can point to fraudulent usage of the cards. In addition, for marketing type of applications, detection of the abnormal behavior can indicate that there is either a short-term behavior change such as travel, vacationing, or long-term life-stage change such as marriage, graduation, family with new born, etc. that causes the shift of behavior. In some embodiments, marketers may use the information about changed behaviors to offer different types of products to the user that better suit his/her new needs. Furthermore, for credit risk type of application, a shift of behavior can be associated with higher level of risk so that strategy can be devised to mitigate the new risk. The same technique can also be used to identify users that are similar to each other, or, have preference/dislike to combinations of certain types of merchants, so that such information can also be used to perform target marketing.

In some embodiments, the systems and methods disclosed herein may use concepts from computational linguistics and neural networks to represent the transactions in a distributed sense. For example, the transactions may be represented as high-dimensional vectors (such as 200-300 dimensions). Distributed representation of the transactions may encode the transactions as well as the relations with other transactions. Such encoding of the transactions and relationship may provide the following non-limiting advantages:
(1) It allows the models built on the representation to generalize to unseen but similar patterns;
(2) It provides a natural way of calculating the similarity among transactions; and
(3) It requires significantly less amount of storage (several order of magnitudes) to encode the similarity relation as compared to alternative methods, thus it enables near-real time look-up of similar transactions.

In some embodiments of the systems and methods disclosed herein, the unsupervised nature of the machine learning techniques employed allows for fraud detection, target marketing, and credit/attrition risk prediction without requiring prior knowledge of the 'tag' or 'label' for each of the transactions used. This provides the benefit of removing the collection of such 'tag' data, which can be costly and time-consuming. Thus, this systems and methods disclosed herein provide a solution to jump-start the prediction without needing to wait for the collection to complete.

Distributed Representation of Transactions and their Similarity

Abnormal behaviors may be defined as activity that is not normally seen in the user's transaction patterns. For example, systems may identify abnormal activities as those that are considered to be dissimilar to the user's normal activities. These dissimilar activities may not be identified by direct comparison to the user's previous activities (typically done in other systems). Instead, 'similar' activity to the user's past activity may be considered to be normal. Furthermore, the 'similarity' may be learned to see historically how various activities are associated with each other by learning from the behavior of pools of users. In some embodiments, the systems disclosed herein may define the similarity between transactions as how likely these transactions will be conducted by the same individual, potentially within a pre-defined timeframe.

In some embodiments, the similarities of transactions are generated using similar concepts as used in computational linguistics. In particular, some embodiments use the language model, which aims to learn statistically how words appear in sentences. The language model utilizes the fact that words do not appear together randomly in real-life if the words are put together according to grammatical rules. Analogizing this concept to transactions, users tend to shop at similar stores and purchase goods per their preference and tastes. Therefore, many of the techniques in the language model can be applied in this area.

In some embodiments, systems and methods disclosed herein use a novel representation for the calculation and storage of the 'transaction activity', specifically the attributes of the transactions. A transaction is usually described by several attributes. For credit card transactions, transaction attributes may include: transaction date/time, transaction amount, merchant's method of accepting the card (e.g. swiped or keyed or internet), merchant location, merchant identification (name and ID), merchant category code (MCC, SIC, etc.), other 'derived' attributes that provide refined or composite information of these attributes, and/or the like. Instead of representing the activity either by its names/tokens such as "San Diego, Walmart," its numerical values such as dollar amount $18.50, time 10:35 (am), or date 04/04/09, or based on other attributes detected during the activity, the activity can be projected into a high dimension vector of values. One example of this high dimension vector of values may be a series of numbers. For example, in some embodiments, transactions are represented as vectors whereby a vector includes an ordered series of values between −1.0 and 1.0. Each value within the vector may be used to indicate a value summarizing one or more transaction attributes. This may provide the benefit that any type of features included in transaction data for an activity may be incorporated into the distributed representation (e.g., a vector). Furthermore, composite features can also be represented as such a vector. For example, a composite feature may indicate co-occurrence of more than one feature in the transaction data. For example, a vector representation can be provided to indicate a transaction for shopping during lunch hour at department store.

Figure 1:
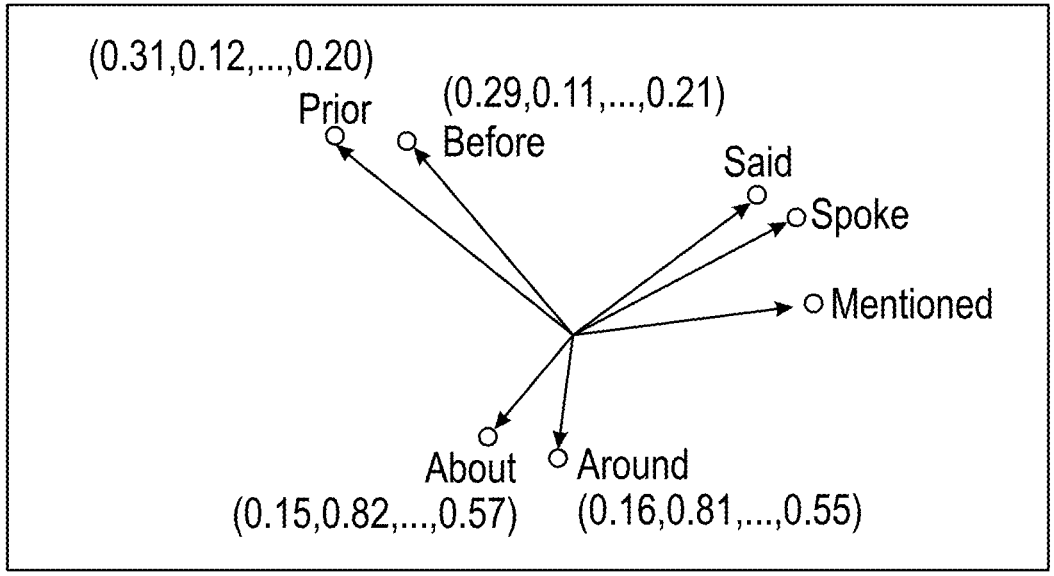
FIG. 1 illustrates high dimensional space modeling using the examples of words in English language.

The vectors representing similar transaction, based on any transaction attributes obtained by the system, are generated to be close to each other in the high dimensional space. FIG. 1 illustrates high dimensional space modeling using the examples of words in English language. In implementations using transaction data, each transaction would be analogized to a word. For simplicity, the modeled entity (e.g., words in FIG. 1) are shown on a three dimensional axis, although the vectors are in much higher dimensions. The closeness of the vectors can be measured by their cosine distance. One expression of cosine distance for two vectors (A) and (B) is shown in Equation 1.

$$\text{similarity} = \cos(\theta) = \frac{A \cdot B}{\|A\| \cdot \|B\|} \qquad \text{Equation 1}$$

Generating Distributed Representations

In some embodiments, the distributed vector representation and the learning of the similarity of among transaction activity can be learned by many different approaches, including matrix factorization and the likes. One embodiment is by using a neural network that learns to map a transaction's attributes to the vector representation, and simultaneously learns to embed the 'similarity' among the transactions in the representation of such vectors.

Figure 2:
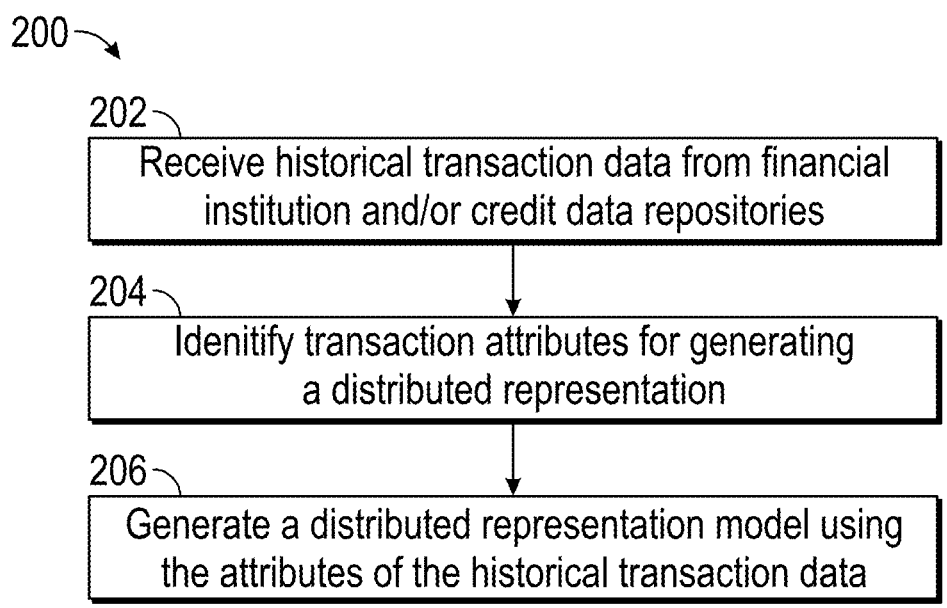
FIG. 2 shows a process flow diagram of a method for generating distributed representations of transactions.

FIG. 2 shows a process flow diagram of a method for generating distributed representations of transactions. The method 200 may be implemented in whole or in part by one or more electronic devices such as the devices described in FIG. 19.

At block 202, a sequence of event records associated with a user are accessed. The sequence of event records may be stored in a data store, such as a relational database. Using a standards based communication (e.g., structured query language messages over TCP/IP), the data store may be queried for event records relating to a user. For example, the data store may associate event records with an identifier for a user. This identifier may be used to index the event records thereby providing an efficient way to retrieve event records for a specific user. The event records accessed from the data store indicate a historical record of events for the specified user. The event records may include time and/or date information indicating when the event occurred. This can be used to order the event records chronologically.

At block 204, a set of attributes of an event record are identified to use for representing the event record. Returning to the analogy with linguistic analysis, at block 204 the 'words' are selected for the transactions such that linguistic models may be applied. There may be several fields of data in each event record. As discussed above, transactions may have various attributes. In various embodiments, the 'word' representing a transaction may be the merchant's name, the merchant's classification or category (for example, the MCC, SIC, and/or the like), the time of the transaction, the place of a transaction, other attributes, a combination of these attributes, or derivative/composite attributes. For example, in some embodiments, each transaction may be treated as a word indicating the MCC of the merchant, may be treated as the MCC and amount of a transaction, or may be treated as the MCC, amount, and location of a transaction. In some embodiments, various attributes may be discretized for improved analysis. For example, the amount of a transaction may be represented as ranges, such as $100 increments, and the time of day may be represented as only the hour a transaction was made as opposed to using the minute and/or second a transaction occurred. The 'word' used to categorize a transaction may be set such that an appropriate number of words is used by the system for generating representations and later use of the representations, as well as based on the similarities that are desired to see in the analysis.

The set of attributes may be selected such that relationships between individual events may be represented in a quantity of memory that is greater than a quantity of memory used to represent the distributed representation of the individual event. For example, for transactions that have multiple attributes, to determine relationships between transactions may require a multidimensional database to represent the links between common transaction attributes. This can be resource intensive to create, maintain, and search. This can be particularly acute in real time implementations such as fraud detection during credit card authorization.

Once a dictionary of words to represent the transactions is selected, at block 206, the method 200 may proceed to generate a model that provides a numerical representation of an event included in the history of events. The numerical representation can be used to identify similarities between transactions. In some embodiments, generating the model may include initializing each of the words representing one or more transactions to a random vector in a high dimensional space. For example, the vectors may be in the range of 200-300 dimensions, or in higher or lower dimensional space. In some embodiments the method 200 may include normalizing the vectors, such as to a common magnitude. In some implementations this allows each vector to be represented as a unit vector. After an initial set of vectors is generated, the co-occurrence of the transactions are used to move related transactions closer to each other and unrelated transactions apart from each other. In some embodiments, this is achieved by finding the best vector representation of the transactions that maximize the likelihood measurement of the neighboring transactions appearing together. Equation (2) below shows one expression of how the best vector representation of the transactions ($w_j$) can be generated.

$$\frac{1}{T}\sum_{t=1}^{T} \sum_{-c \le j \le c, j \ne 0} \log p(w_{t+j}|w_t) \qquad \text{Equation 2}$$

where T is a number of event records to be processed;
$w_t$ is the transaction record at point t in the set of event records;
c is a window of analysis defining which event records will be compared to the transaction record $w_t$; and
p(A|B) is the probability of A given B.

The output of the machine learning process may include a model comprising a set of vectors each representing a 'word' that represents one or more transactions in a data set.

Figure 3:
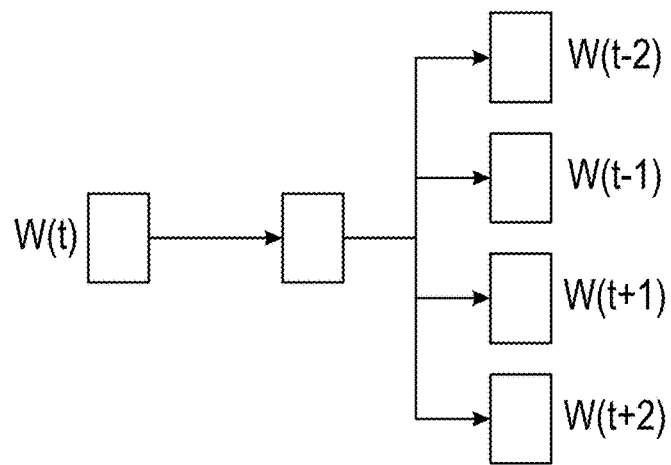
FIGS. 3 and 4 illustrate configurations of neural networks which may be used to generate the distributed representations as used in some embodiments.
Figure 4:
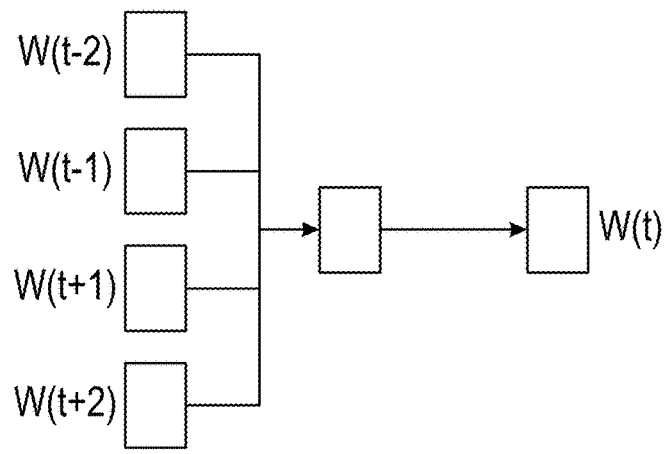

FIGS. 3 and 4 illustrate configurations of neural networks which may be used to generate the distributed representations as used in some embodiments. In FIG. 3, information for a current transaction (W(t)) is provided as an input to the neural network. The information for the current transaction may be a distributed representation of the current transaction. Based on the information for the current transaction, information for a number of previous (e.g., W(t−n)) and subsequent (e.g., W(t+n)) transactions are generated as outputs from the neural network.

In FIG. 4, information for a number of previous (e.g., W(t−n)) and subsequent (e.g., W(t+n)) transactions are inputs to the neural network. As an output, the neural network provides information for an expected transaction at a current time (W(t)).

In some embodiments of FIG. 3 or 4, such as when the temporal order of the events may not be a prominent feature, the neural network can be trained to generate distributed representations of transactions via a simple gradient decent with no hidden layer, or, a more sophisticated neural network with one or more hidden layers can be used to capture their non-linear relation between the transactions. The historical data may be based on a time period during which the transactions were conducted for all users for a client (e.g., a party who wishes to detect fraud such as a bank or payment card issuer)

Figure 5:
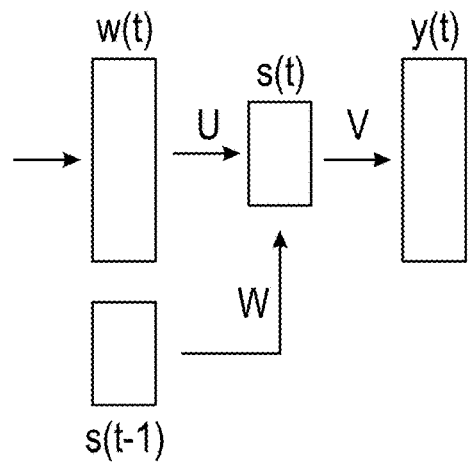
FIG. 5 shows an example recurrent neural network.

In some implementations, such as when the temporal order of the events may be considered, the neural network may be a recurrent neural network, such as that depicted in FIG. 5.

FIG. 5 shows an example recurrent neural network. A recurrent neural network may be used to include consideration of the order of the transactions (e.g., temporally) when generating predicted outcomes. In FIG. 5, w(t) is a word representing the current transaction at time t, and y(t) is next word. The next word (y(t)) may be W(t+1) shown in FIG. 3 or W(t) shown in FIG. 4.

In FIG. 5, s(t) is the context for the next word and s(t−1) is the context for the previous word. The neural network may learn how to combine the current word (w(t)) with the previous context (s(t−1)). U and W are functions that are trained to weight the current word (w(t)) with the previous context (s(t−1)), respectively, prior to generating the current content. Equation 3 is one expression of how the current content may be generated.

$$s(t)=f(U \cdot w(t)+W \cdot s(t-1)) \qquad \text{Equation 3}$$

where f(z) is an activation function for z, an example of which is shown in Equation 4. Equation 4 shows one example of a sigmoid activation function that may be included.

$$f(z) = \frac{1}{1+e^{-z}} \qquad \text{Equation 4}$$

Having established the context for the current word (e.g., s(t), the neural network then generates a the next word y(t). As shown in FIG. 5, V is a function that is trained to weight the context to generate the next word y(t). Equation 5 is one expression of how the next word y(t) may be generated.

$$y(t)=g(V \cdot s(t)) \qquad \text{Equation 5}$$

where g(z) is a softmax function for z, an example of which is shown in Equation 6.

$$g(z_k) = \frac{e^{z_k}}{\sum_i e^{z_i}} \qquad \text{Equation 6}$$

where k is the index of the word.

The neural network model may include the softmax function to allow the output of the neural network model to be used as posterior probabilities for a given variable. The softmax function generally reduces a set of outputs to a series of values between 0 and 1 wherein the set of outputs sum to 1.

Further details on training neural networks, such as recurrent neural networks, can be found in Herbert Jaeger's "A Tutorial on Training Recurrent Neural Networks," GMD Report 159, German Nat'l Research Center for Info. Tech. (October 2002), the entirety of which is hereby incorporated by reference.

Fraud Detection Using Abnormality Calculations

In some embodiments, after a model is generated with transactions modeled as distributed representations, the system may use the model to determine abnormalities in a user's transactions. For example, to determine if a user's behavior has been shifted the system may compare new transactions to previous transaction of the user based on the vector representations of the transactions. For example, to detect whether a credit card been compromised by fraud the system compares the new transaction to the user's previous transactions.

Figure 6:
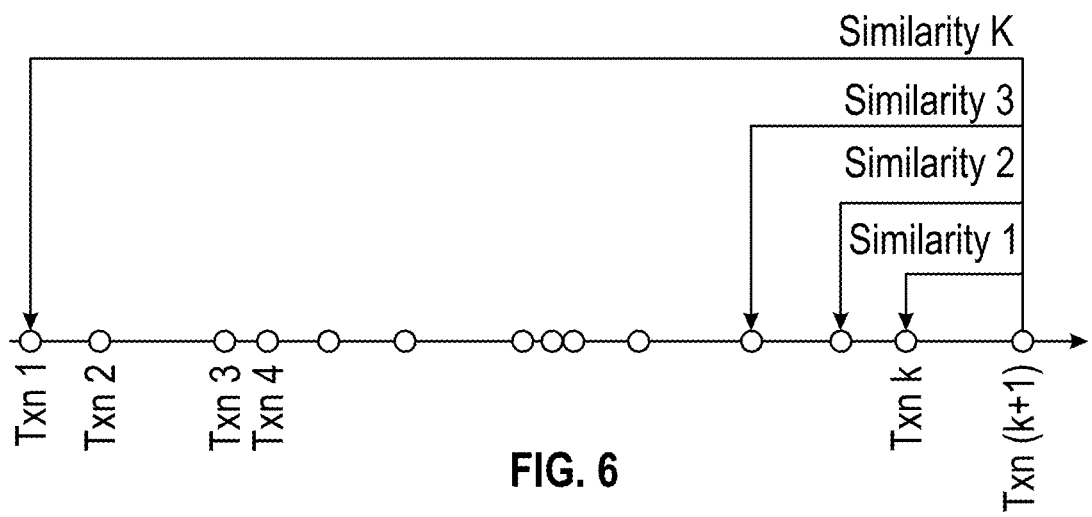
FIG. 6 illustrates a method of comparing new transactions to previous user transactions.

FIG. 6 illustrates a method of comparing new transactions to previous user transactions. Similarities may be generated between a current transaction (Txn(k+1)) and one or more previous transactions (e.g., Txn 1 through Txn k as shown in FIG. 6).

There may be various metrics which can be generated to identify whether a new transaction is outside of an expected transaction based on the similarity to previous transactions. For example, the 'distance' between the new transaction and previous transaction may be calculated and the system may make decisions based on the distances. In some embodiments the distance may be measured as a cosine distance between the transaction vectors. In some embodiments, the system may analyze the similarities of previous transactions using a mean or percentile of the similarities between the current transaction (txn k+1) and all the transactions in an evaluation window. The evaluation window may specify which transactions to compare with the current transaction. For example, the evaluation window may which may comprise a number of transactions immediately preceding the current transaction. In some implementations, the evaluation window may identify transactions in a previous time window (e.g., range of time).

In some embodiments, the system may analyze the similarities of previous transactions using a maximum or minimum of the similarities between the current transaction (txn k+1) and all the transactions in the evaluation window In some embodiments, the system may analyze the similarities of previous transactions using a geometric mean of the similarities (scaled from (−1, 1) to (0,1)) between the current transaction (txn k+1) and all or a portion of the transactions in the evaluation window. In some embodiments, the system may analyze the similarities of previous transactions using a similarity of the newest transaction to a vector representing the exponentially weighted moving average of the user. For example, the similarity of the vector representing the current transaction (txn k+1) and the vector representing the user's behavior may be updated to consider the current transaction. One expression of how the vector representing the user's behavior may be updated is provided in Equation 7 below.

$$\overrightarrow{C_{k+1}} = \begin{cases} \alpha \overrightarrow{C_k} + (1-\alpha)\overrightarrow{T_{k+1}} & \text{if } k > M \\ \frac{k}{k+1}\overrightarrow{C_k} + \frac{1}{k+1}\overrightarrow{T_{k+1}} & \text{if } k \leq M \end{cases} \qquad \text{Equation 7}$$

where $\overrightarrow{C_{k+1}}$ is the vector representing client after the k+1-th transaction;

$\overrightarrow{T_{k+1}}$ is the vector representing the k+1-th transaction;

α is an exponential decay factor; and

M is called a maturation window size, which prevents the earlier transactions (e.g., further in time from the current transaction) from getting a much higher weight than other transactions.

In some embodiments, depending on how the distributed representation of the transactions is generated, the vectors may not be normalized. All the vectors appearing in the equation above (e.g., $\overrightarrow{C_k}$, $\overrightarrow{T_{k+1}}$), however, can be normalized. If the transaction vectors are normalized, $\overrightarrow{C_{k+1}}$ should also be normalized after it is updated. In some embodiments, vectors may be normalized so that each transaction would have an equal contribution in the evaluation, but not only contributions from those transactions represented by high-magnitude vectors. In some embodiments, whether vectors are normalized or may not substantially affect the systems performance.

As an example, in the area of plastic card fraud, the elements in the transactions that can be used to generate the distributed representation and to calculate the similarity between transactions can be, but not limited to one or more of:

merchant location (ZIP3, ZIP5, etc.)

merchant ID merchant name merchant category code (MCC)

standard industrial classification code (SIC)

transaction category code (TCC)

merchant category group code (MCG code)

transaction amount point-of-sale acceptance method transaction date/time, day of week, time of day, etc.

derivation of the aforementioned fields combination of the aforementioned fields and/or their derivations It can also be higher order of the aforementioned fields such as the difference in days, in amounts, percentage changes, etc. between two or more neighboring transactions. For non-card based transaction, behavior may be detected using one or more of IP address, geo-location, network location (e.g., webpage visited), items in an electronic shopping cart, SKU number, or the like.

In some embodiments, composite variables may also be created by combining two or more such variables. One example combination may be a comparison of the closest similarity for a current word in the evaluation window to an average similarity for the evaluation window. An expression of this combination is shown in Equation 8 below.

$$\frac{\max\_sim(w(t))}{mean\_sim(w(t))} \quad \text{Equation 8}$$

where max_sim(w(t)) is the maximum similarity value of the set of similarity values between the current word (w(t)) and words in the evaluation window; and mean_sim(w(t)) is the mean similarity of the set of similarity values between the current word (w(t)) and words in the evaluation window.

Another example combination may be a comparison of recent similarities to longer-term similarities. An expression of this combination is shown in Equation 9 below.

$$\frac{mean\_sim_x(w(t))}{mean\_sim_{x+n}(w(t))} \quad \text{Equation 9}$$

where mean_sim$_x$(w(t)) is the mean similarity value of the set of similarity values between the current word (w(t)) and words in a first evaluation window x (e.g., x=30 days); and mean_sim$_{x+n}$(w(t) is the mean similarity of the set of similarity values between the current word (w(t)) and words in a second evaluation window that is larger than x by n (e.g., n=60 days).

It is observed that with the aforementioned measurement, as compared to the user's with normal behavior, the user whose card is compromised tend to have much higher chance to have low similarity or higher risk score between the fraudulent transactions and the user's historical transactions.

Figure 7:
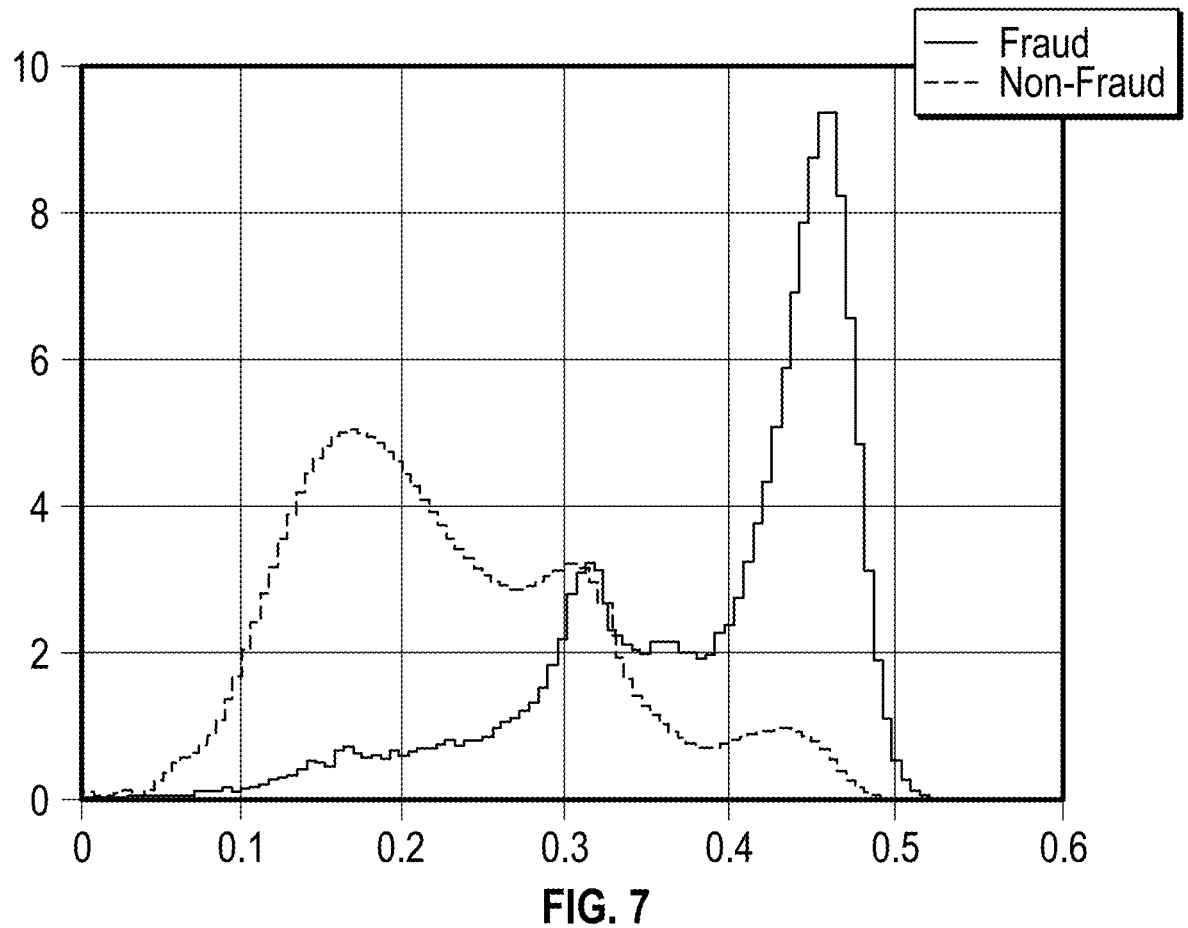
FIG. 7 illustrates a plot of experimental detection performance of an attribute similarity score.

FIG. 7 illustrates a plot of experimental detection performance of an attribute similarity score. The x-axis of the plot shown in FIG. 7 represents the score of the attribute and the y-axis represents the probability of fraud. As shown in FIG. 7, the fraud curve indicates scores for the attribute that are likely to be associated with fraudulent behavior while the non-fraud curve indicates scores that are associated with non-fraudulent behavior. The plot may be generated using historical data for one or more users and attribute scores generated from the historical data.

Figure 8:
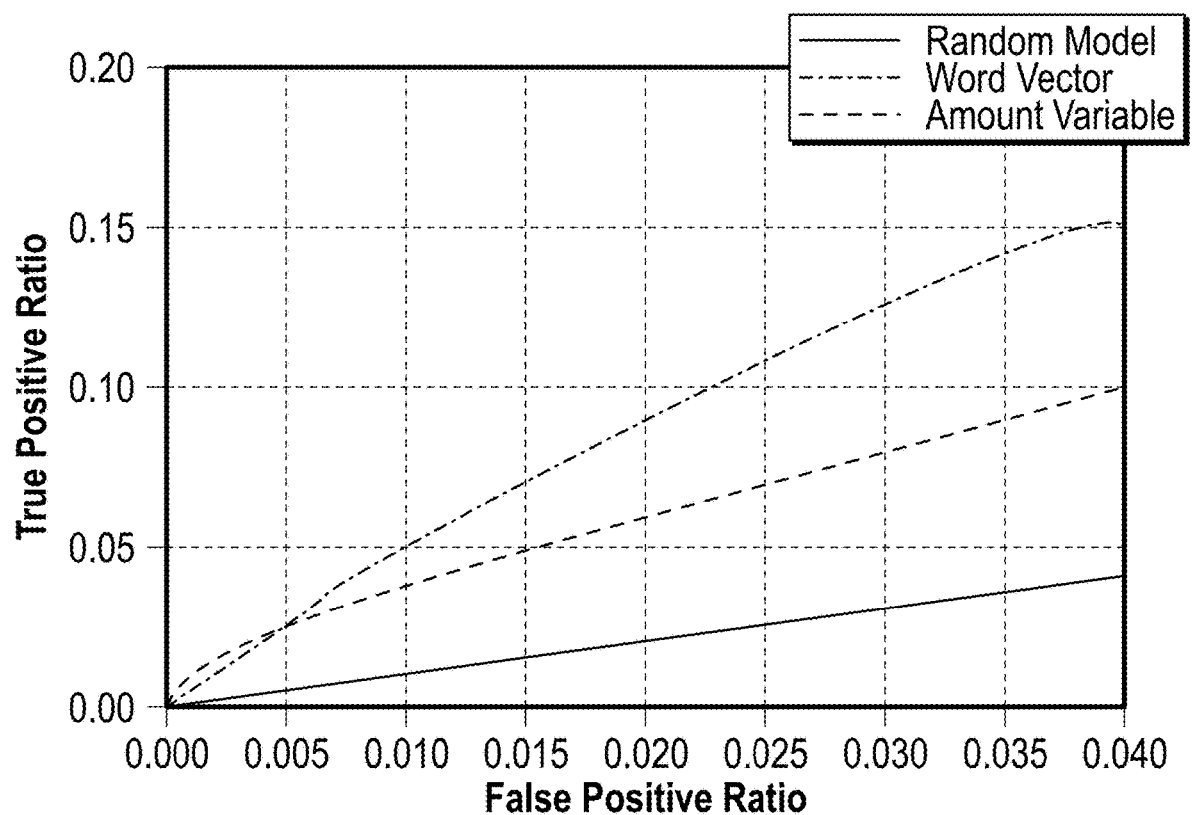
FIG. 8 illustrates a plot of experimental detection performance for three different methods of detection.

FIG. 8 illustrates a plot of experimental detection performance for three different methods of detection. As shown in FIG. 8, the plot represents a receiver operating characteristic curve for three behavior detection models. Specifically, FIG. 8 compares the performance of behavior abnormality detection for fraud purposes of the word vector method described in this application along with a commonly used variable in fraud modeling namely variability in the amount for the transactions. A curve showing the performance of a random detection model is also shown as a baseline of performance for a model that randomly guesses whether a transaction is fraudulent.

As shown in FIG. 8, the x-axis represents a ratio of positive detections to truly fraudulent transactions. The y-axis represents a ratio of positive detections as fraudulent of truly legitimate transactions. The performance of the word vector detection model exceeds the variability model. The systems and methods disclosed herein, which incorporate such word vector detection methods, generate greater fraud detection with reduced false positives than the commonly used method relying on variability in the amount for the transactions.

Furthermore, the systems and methods disclosed herein generate additional insight when compared to other behavior detection techniques. For example, the systems may generate additional insight than what the traditional fraud variables can detect by using the distance of the transaction locations.

Figure 9A:
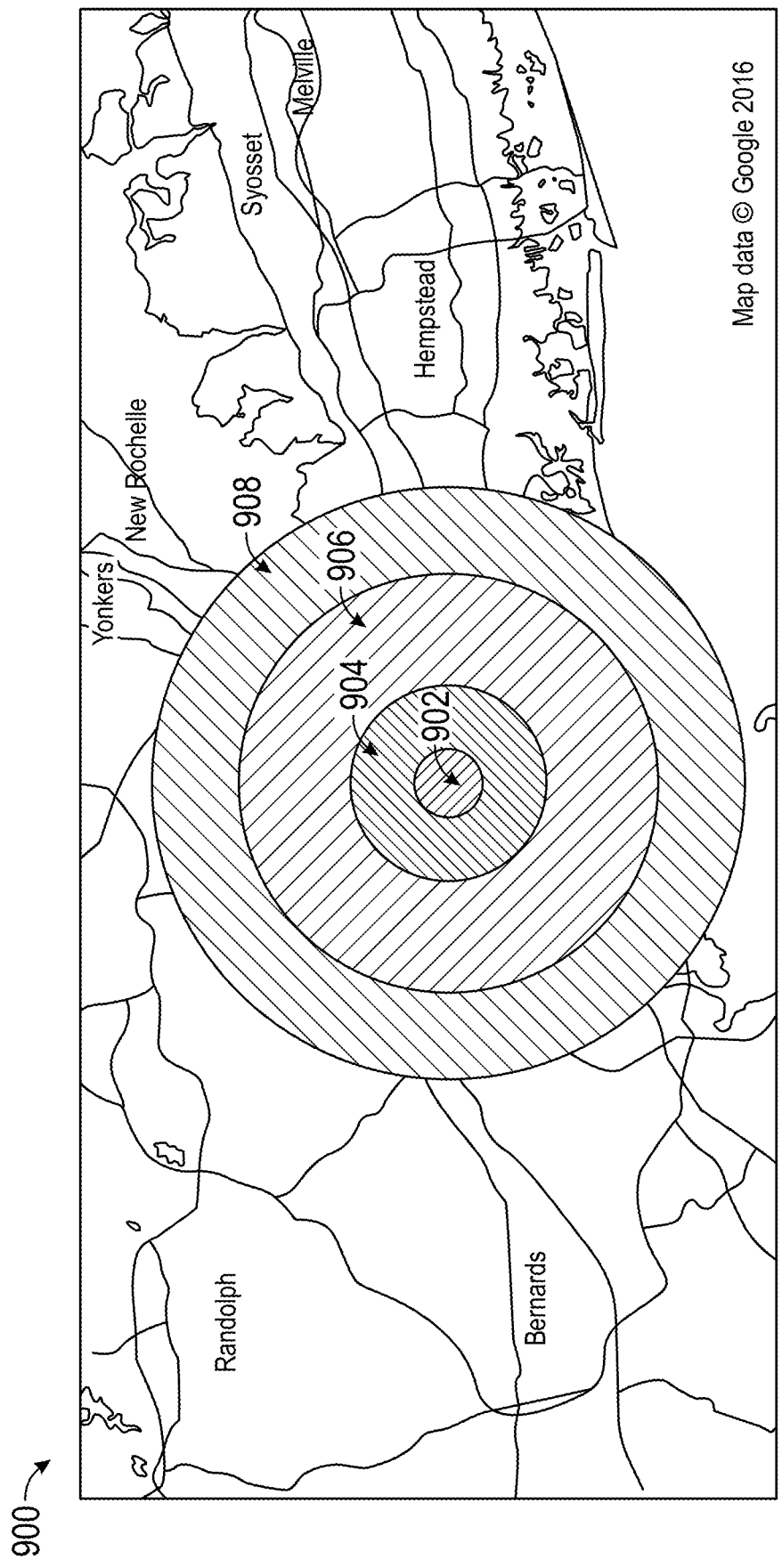
FIG. 9A shows a geospatial fraud map.

FIG. 9A shows a geospatial fraud map. As shown in the map 900 of FIG. 9A, the user may be associated with a home area 902. One way to detect fraud events is based on the distance from the home area 902. For example, a transaction at a second area 904 may be more likely to be a fraud event than a transaction within the home area 902. Similarly, a transaction occurring at a third area 906 may be more likely to be fraudulent than a transaction within the second area 908. The third area 910 may be associated with yet a higher probability of fraud than the home area 902, second area 904. A fourth area 908 may be associated with the highest probability of fraud and then any activity beyond the fourth area 908 may be automatically flagged as suspect or associated with a default probability.

One limitation of the geospatial fraud map shown in FIG. 9A is the linear nature of the probabilities. The probability of a given transaction being fraudulent is a function of how far away from the home area 902 the transaction is conducted. This treats the areas in a consistent fashion without considering the behavior of actual actors in these locations.

Figure 9B:
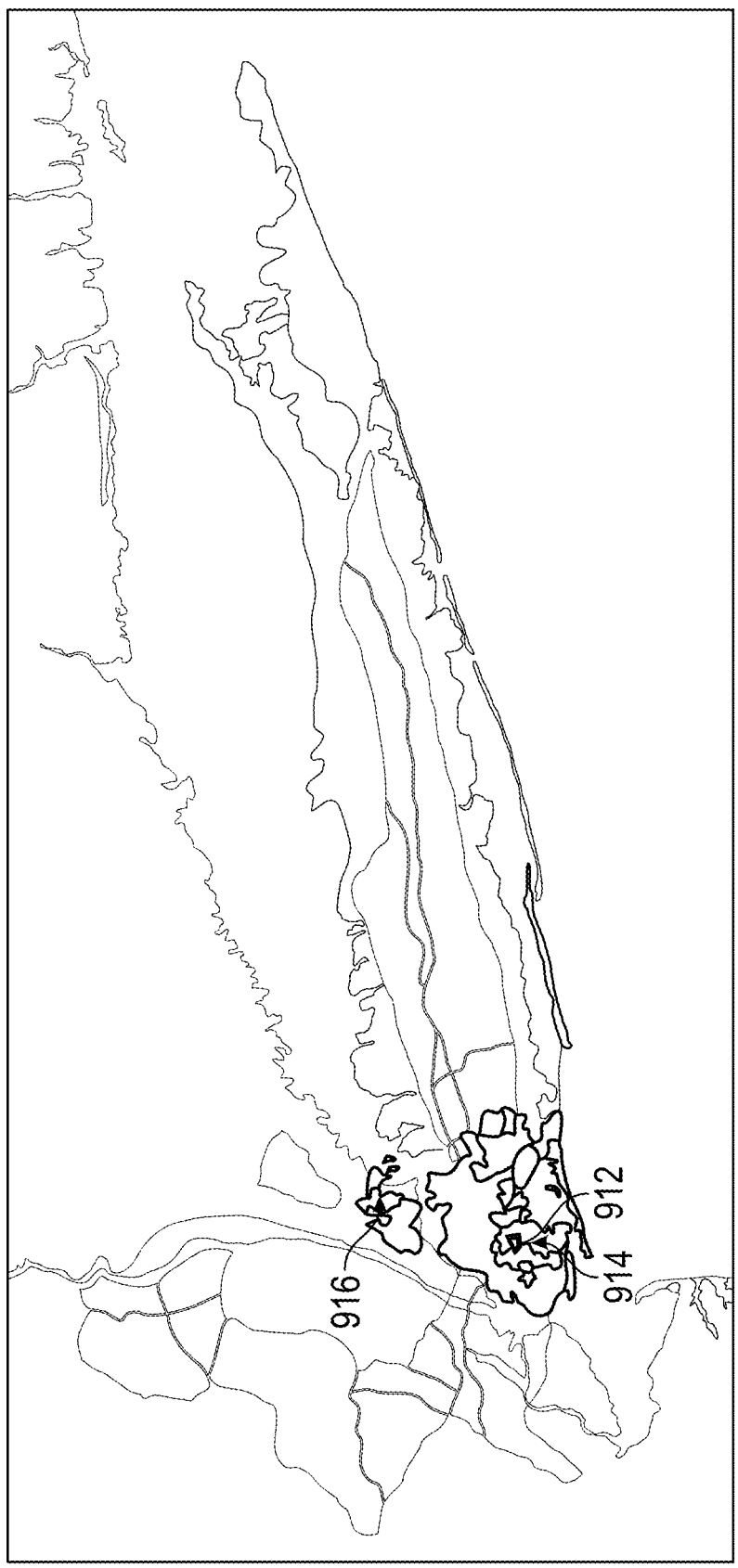
FIG. 9B shows an alternative geospatial fraud map.

FIG. 9B shows an alternative geospatial fraud map. As shown in the map 910 of FIG. 9B, a home area 912 is identified. For the users within the home area 912, the map 910 identifies other locations that users from the home area 912 tend to conduct transactions. The locations may be identified based on the transaction similarities. For example, users from the home area 912, may be urban dwelling people reliant on public transportation. As such, the areas where these users tend to conduct transactions may be concentrated in a first area 914. The first area 914 may be associated with a lower probability of fraud than a more remote area 916 where users from the home area 912 do not tend to conduct transactions.

Figure 9C:
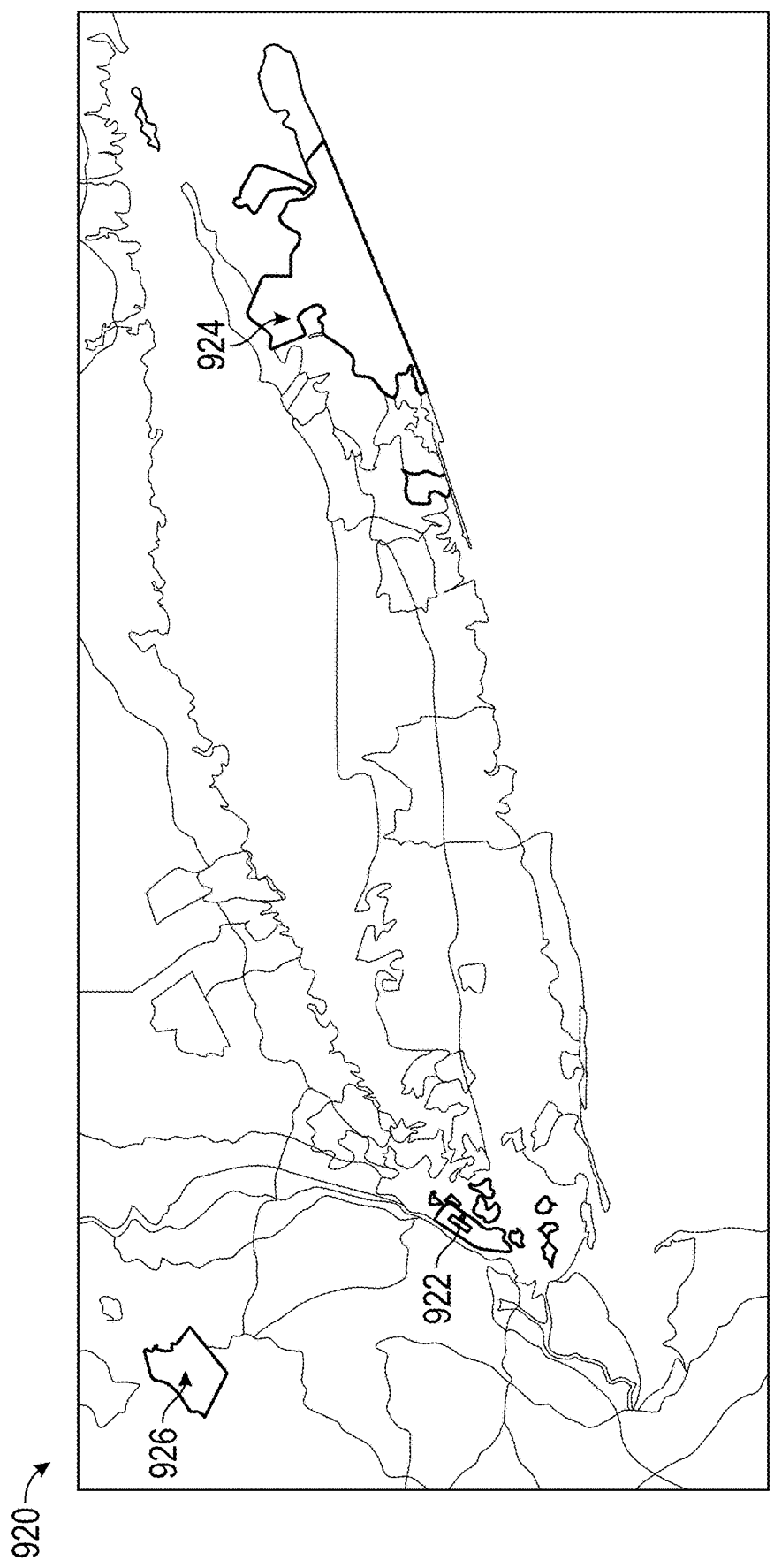
FIG. 9C shows yet another geospatial fraud map.
Figure 10:
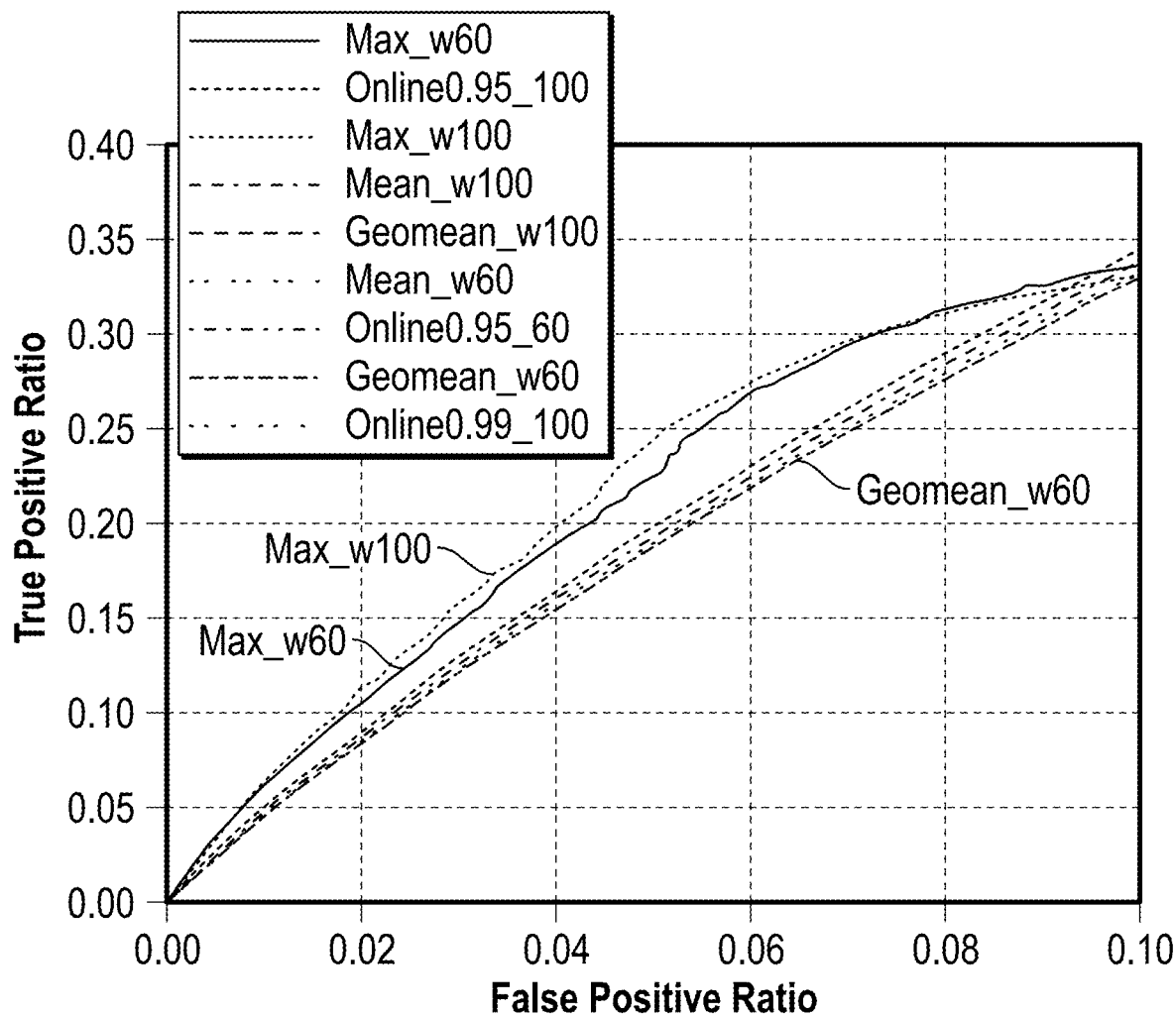
FIG. 10 illustrates a plot of experimental detection performance for nine different methods of detecting behavior abnormalities.

FIG. 9C shows yet another geospatial fraud map. It will be appreciated that the map 920, like the map 900 and the map 910, is of New York. In FIG. 9C, a home area 922 is shown. This home area 922 is generally located in Manhattan that tends to be an affluent area of New York. The users who live in this home area 922 may have further reaching areas for conducting transaction such as at their vacation home in a second area 924 or a resort located in a third area 926. FIG. 9C shows how the linear approach of FIG. 9A would fail to accurately represent the behavior risk for the users from the home area 922. FIG. 10 illustrates a plot of experimental detection performance for nine different methods of detecting behavior abnormalities. As shown in FIG. 10, the plot represents a receiver operating characteristic curve for nine different composite detection methods that may be implemented or included in the systems disclosed herein.

The detection methods shown in FIG. 10 are summarized in Table 1 below.

TABLE 1

| Acronym | Description |
| --- | --- |
| max_w60 | Detection based on maximum difference between a vector for a transaction and a vector of transactions within the last 60 days. |
| online0.95_100 | Detection based on the comparison of a vector for a transaction and a vector of transactions smoothed using a parameter of 0.95 within the last 100 days. |

TABLE 1-continued

| Acronym | Description |
| --- | --- |
| max_w100 | Detection based on maximum difference between a vector for a transaction and a vector of transactions within the last 100 days. |
| mean_w100 | Detection based on mean difference between a vector for a transaction and a vector of transactions within the last 100 days. |
| geomean_w100 | Detection based on geometric mean between a vector for a transaction and a vector of transactions within the last 100 days. |
| mean_w60 | Detection based on mean difference between a vector for a transaction and a vector of transactions within the last 60 days. |
| online0.95_20 | Detection based on the comparison of a vector for a transaction and a vector of transactions smoothed using a parameter of 0.95 within the last 20 days. |
| geomean_w60 | Detection based on geometric mean between a vector for a transaction and a vector of transactions within the last 60 days. |
| online0.99_100 | Detection based on the comparison of a vector for a transaction and a vector of transactions smoothed using a parameter of 0.99 within the last 100 days. |

In some embodiments, the variables can also be combined to take advantage of the different information embedded in them. For example, the maximum difference may be combined with a geometric mean.

How the combination is performed can also be identified by the system using automated learning.

One way the combination can be generated is through unsupervised learning. In the unsupervised scenario, variables can be combined such as by generating an average of the variables, or generating an average weighted by confidence in how predictive each variable is considered of fraudulent behavior. It can also be combined by many other unsupervised learning algorithms such as principal component analysis (PCA), independent component analysis (ICA), or higher-order methodology such as non-linear PCA, compression neural network, and the like. One non-limiting benefit of using unsupervised learning is that it does not require 'tags' or other annotations to be added or included in the transactions to aid the learning.

Figure 11:
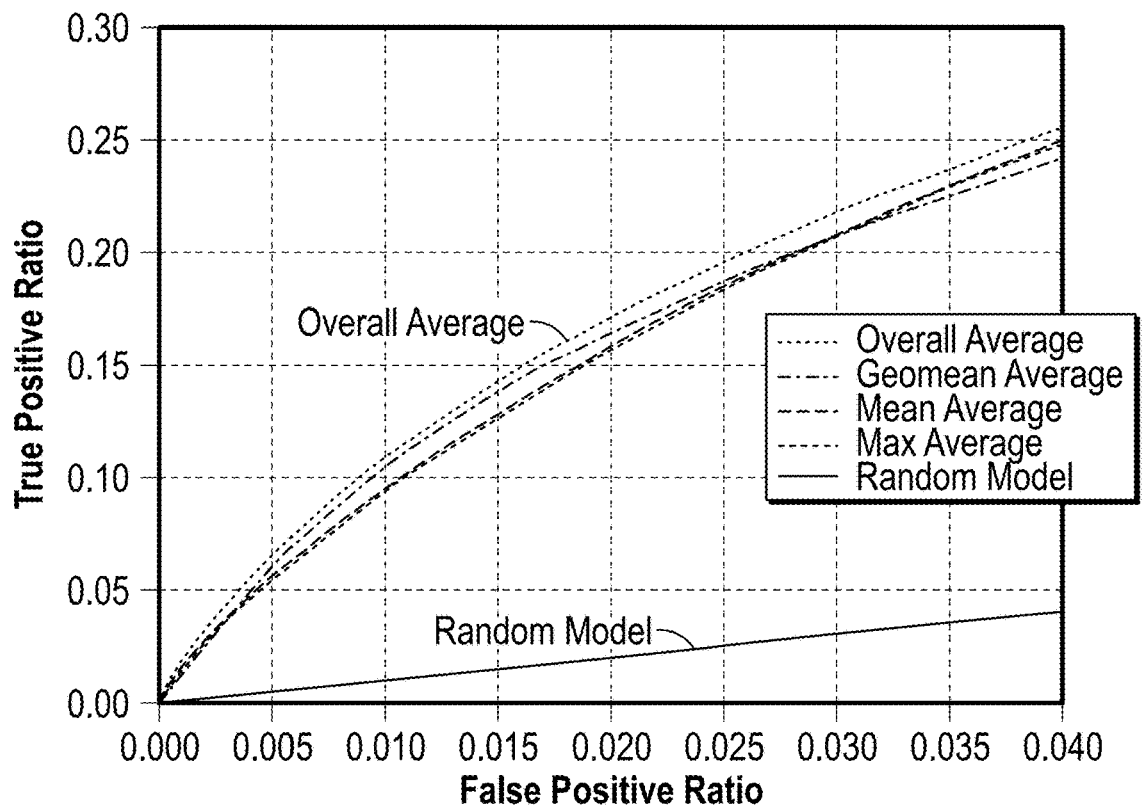
FIG. 11 illustrates a plot of experimental detection performance for four different methods of detecting behavior abnormalities using unsupervised learning.

FIG. 11 illustrates a plot of experimental detection performance for four different methods of detecting behavior abnormalities using unsupervised learning. As shown in FIG. 11, the plot represents a receiver operating characteristic curve for four different unsupervised learning methods that may be implemented or included in the systems disclosed herein.

The highest performing method, overall average, is labeled in FIG. 11. A curve showing the performance of a random detection model is also shown and labeled as a baseline of performance for a model that randomly guesses whether a transaction is fraudulent. The results shown in the plot of FIG. 11 clearly provide an improvement over random guessing when detecting behavior anomalies. Table 2 below summarizes the four methods for which curves are plotted in FIG. 11.

TABLE 2

| Short Description | Long Description |
| --- | --- |
| Overall Average | Detection based on unsupervised machine learning combination of a weighted average of the detection results from all variables. |
| Geomean Average | Detection based on unsupervised machine learning combination of a weighted average of the geometric mean difference detection results. |

TABLE 2-continued

| Short Description | Long Description |
| --- | --- |
| Mean Average | Detection based on unsupervised machine learning combination of a weighted average of the mean difference detection results. |
| Max Average | Detection based on unsupervised machine learning combination of a weighted average of the maximum difference detection results. |

Another way the combination of variables can be defined is through supervised learning. When training targets are available (e.g., historical data with known behaviors detected), the performance of the variables and how they are combined can be further improved by learning a linear or non-linear model of the combination of the variables. One example of supervised learning in neural network modeling. In a neural network model, the model is adjusted using feedback. The feedback is generated by processing an input and comparing the result from the model with an expected result, such as included in the training targets.

Figure 12:
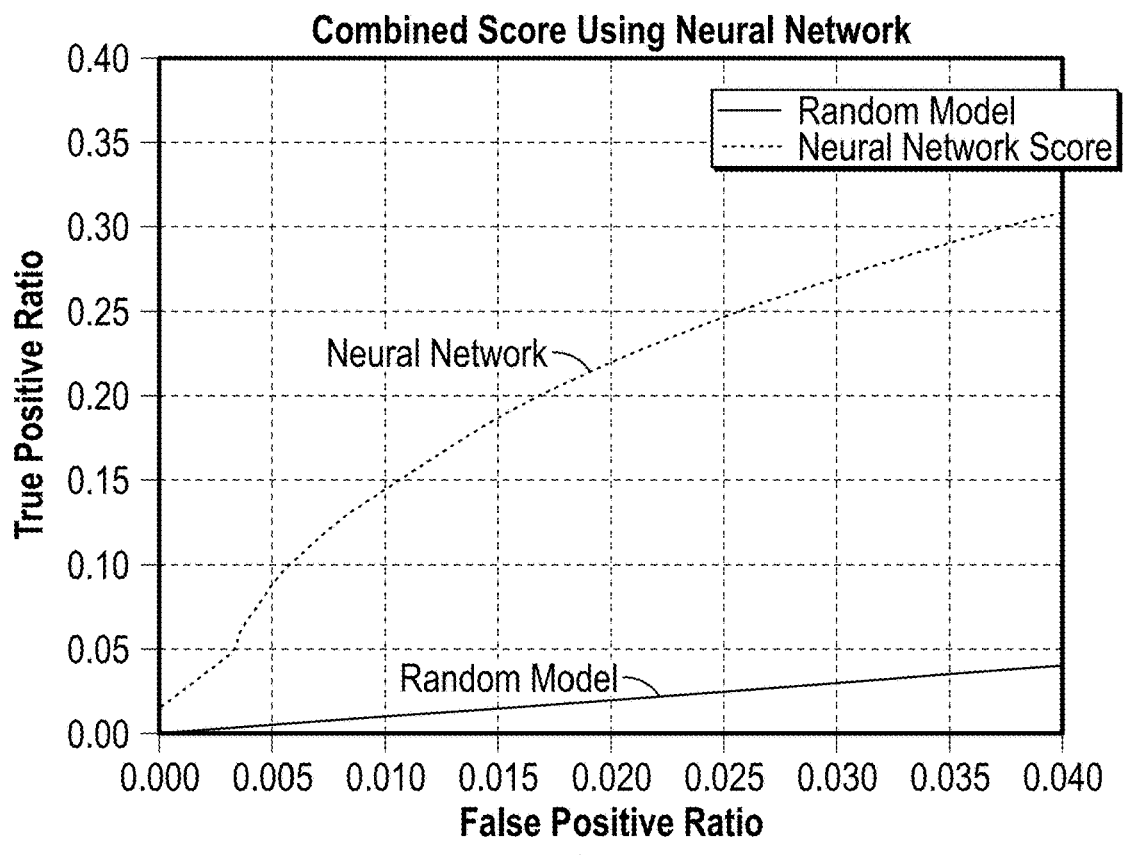
FIG. 12 illustrates a plot of experimental detection performance for a combination of variables based on supervised learning.

FIG. 12 illustrates a plot of experimental detection performance for a combination of variables based on supervised learning. As shown in FIG. 12, the plot represents a receiver operating characteristic curve for a neural network supervised learning method that may be implemented or included in the systems disclosed herein as compared to a random model. As in FIG. 11, the learned model significantly outperforms the random model.

Scoring System

Figure 13A:
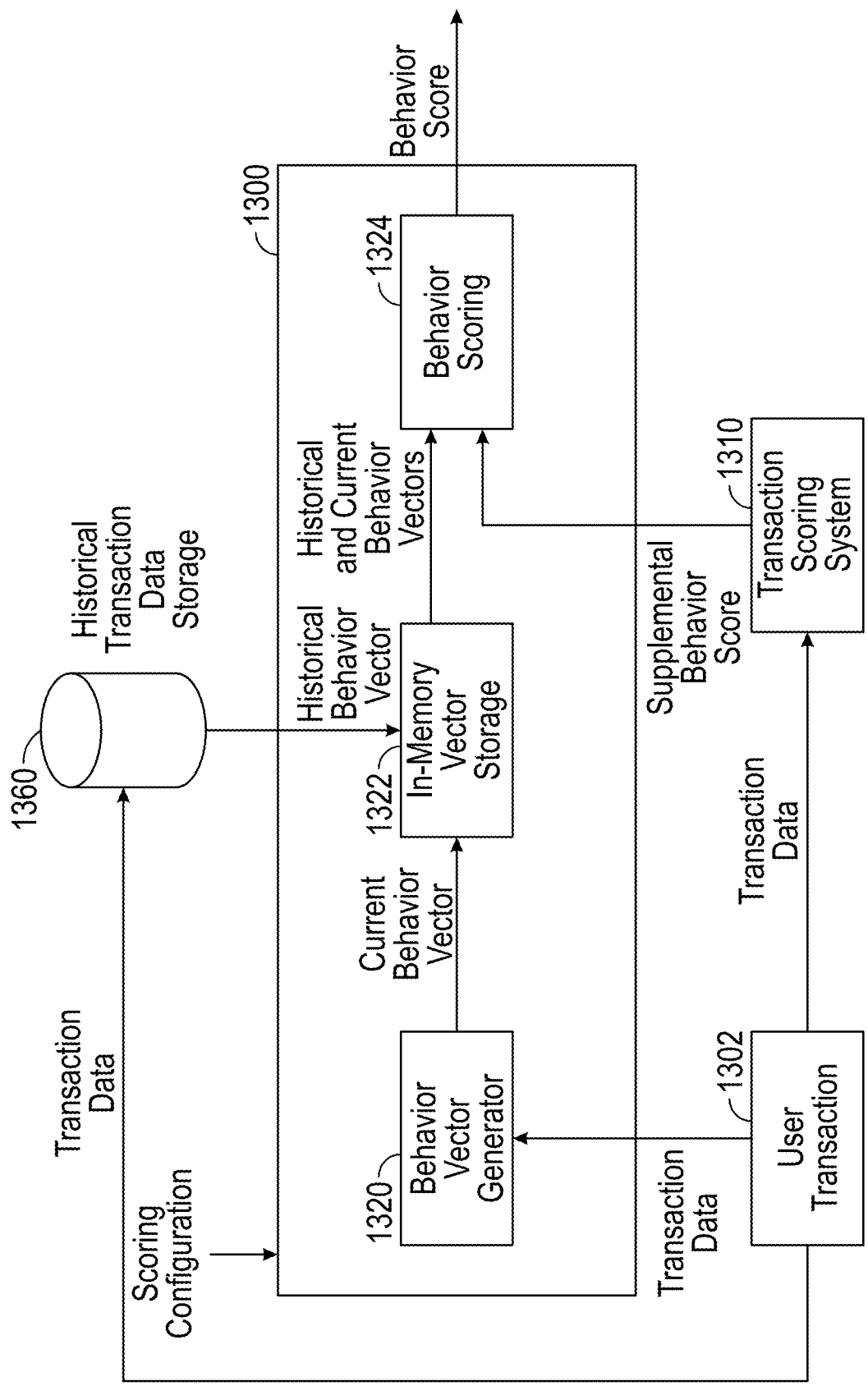
FIG. 13A shows a functional block diagram of an example behavior scoring system.

FIG. 13A shows a functional block diagram of an example behavior scoring system. In some embodiments, a fraud detection system may include a behavior scoring system 1300 or communicate with the behavior scoring system 1300 (e.g., via a network) to obtain one or more similarity scores for a behavior (e.g., a transaction). As shown in FIG. 13A, the behavior for which a score will be generated is a user transaction 1302. The behavior scoring system 1300 may receive the user transaction 1302. The user transaction 1302 may be received from an event processing device such as a card reader.

A behavior vector generator 1320 may be included to generate a distributed representation of the user transaction 1302. The behavior vector generator 1320 may be configured to generate the distributed representation based on a model identified in a scoring configuration, such as generated by the method 200 in FIG. 2. The model may be identified by the behavior vector generator 1320 based on the user, the client (e.g., entity for whom the score is being generated such as a card issuer or a merchant), or operational characteristics of the behavior scoring system 1300. For example, computationally complex models may provide more accurate scores, but the processing to generate the score may be resource intensive. Accordingly, one or more operational characteristics of or available to the behavior scoring system 1300 may be used to select the model which consumes a level of resources (e.g., power, processor time, bandwidth, memory, etc.) available to the behavior scoring system 1300.

The current behavior vector may be provided to an in-memory vector storage 1322. The in-memory vector storage 1322 is a specially architected storage device to efficiently maintain distributed representations such as vectors. The in-memory vector storage 1322 may also store one or more historical vectors that can be used for generating the behavior score. The historical vectors may be received from a historical transaction data storage 1360. In some implementations, the user transaction 1320 may be stored in the historical transaction data storage 1360, such as after processing the user transaction 1320. The historical vectors for the historical transactions may be provided in response to a request from the behavior scoring system 1300. In some implementations, the user transaction 1320 may be provided in a message. The message may also include information to obtain the historical transaction data. Such information may include a user identifier, an authorization token indicating permission to release of at least a portion of the user's historical data, and the like. The behavior scoring system 1300 may, in turn, transmit a request including such information to the historical transaction data storage 1360. In response, the historical transaction data storage 1360 may provide historical transaction information. As shown in FIG. 13A, the distributed representation is provided from the historical transaction data storage 1360. In some implementations, where raw transaction data is provided, the raw transaction data may be processed by the behavior vector generator 1320 to obtain distributed representations of the historical transaction data.

In the implementation shown in FIG. 13A, to generate the distributed representation two memory components may be used. The historical transaction data storage 1360 may be included to store the historical transactions. The historical transaction data storage 1360 may be a specially architected memory indexed by information identifying users. This can expedite retrieval of the transaction data and/or distributed representations for a user using the identifying information. The in-memory vector storage 1322 may be included as a second memory component. The in-memory vector storage 1322 may be implemented as a storage (preferably using the main memory such as RAM) to store the distributed representation (or vectors) of the entities (e.g. merchant ID, ZIP5, etc.) to be compared. The behavior scoring system 1300 shown in FIG. 13A is an embodiment of a real-time fraud scoring system that can generate a score in real-time such as during the authorization of a transaction.

In the implementation shown in FIG. 13A, the user transaction 1302 is also processed by an optional transaction scoring system 1310. The transaction scoring system 1310 is a secondary behavior scoring system that may provide supplemental behavior scoring information. The transaction scoring system 1310 may be installed on the client's systems (e.g., merchant server, issuer server, authorization server, etc.). This configuration allows clients to affect the behavior scoring according to their individual needs. For example, a bank may wish to include one or more inputs to the behavior scoring generated by their own proprietary systems.

Having generated the corresponding distributed representations for the data attributes to be compared from the user transaction 1302 and obtained the corresponding distributed representation for the historical transactions of the same user, a behavior scoring module 1324 may be included in the behavior scoring system 1300. The behavior scoring module 1324 may be configured to generate the behavior score for the user transaction 1302. The behavior score may include a value indicating the likelihood that the behavior is consistent with the historical behavior. When available, the behavior scoring module 1324 may also include the supplemental behavior score to generate a final behavior score for the user transaction 1302. The user transaction 1302 may be stored in the historical transaction storage 1360.

In some implementations, the behavior scoring module 1324 may identify a behavior anomaly using a degree of similarity between the current and historical behavior vectors. In such implementations, a single output (e.g., indicating fraud or not fraud) may be provided rather than a similarity score. The single output may be generated by comparing a similarity score to a similarity threshold. If the similarity score indicates a degree of similarity that corresponds to or exceeds the similarity threshold, the no fraud result may be provided. As discussed above with reference to FIGS. 10-12, the score may be generated using a composite of different comparison metrics (e.g., mean, geometric mean, varying historical transaction windows, etc.).

Figure 13B:
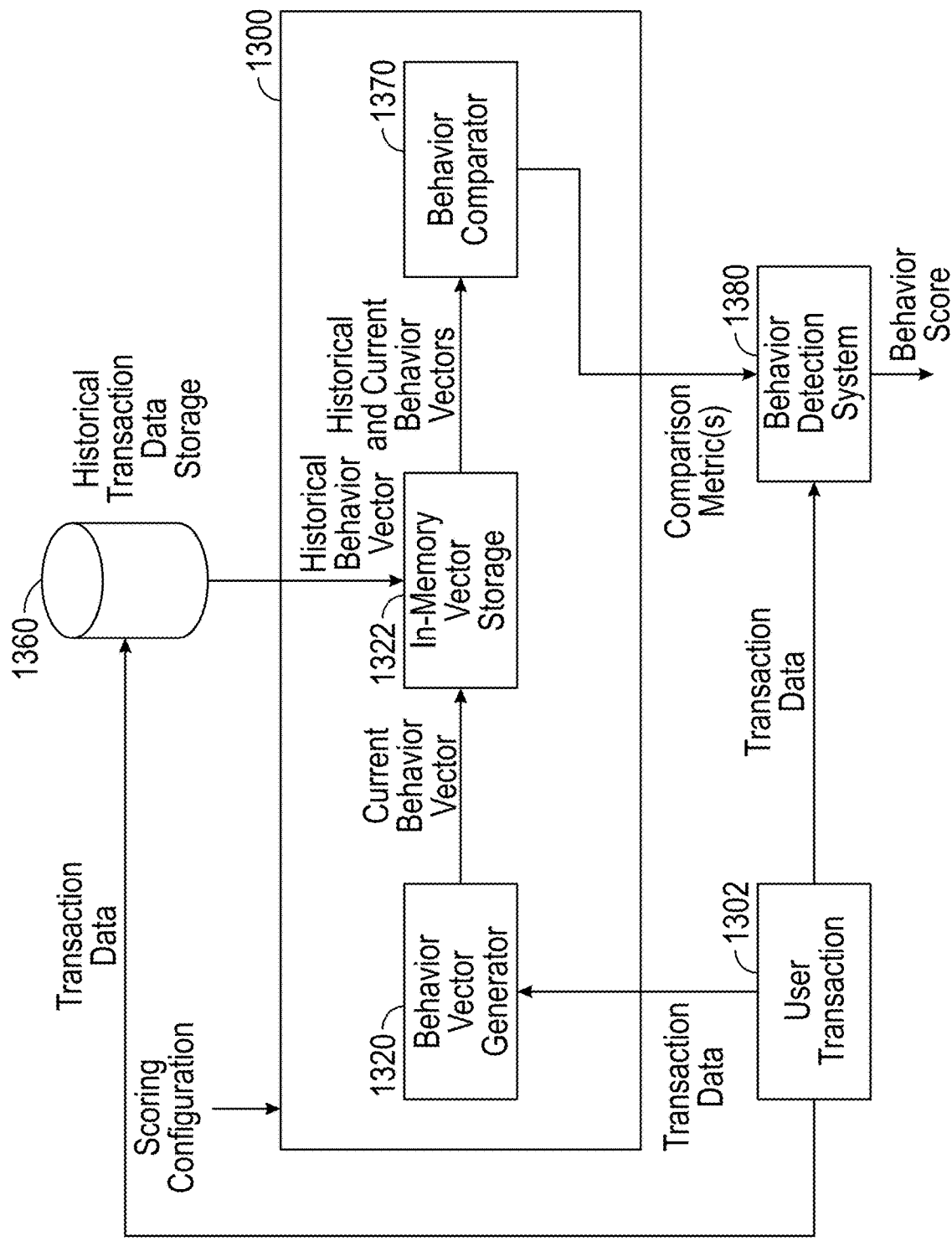
FIG. 13B shows a functional block diagram of another example behavior scoring system.

FIG. 13B shows a functional block diagram of another example behavior scoring system. In some embodiments, a fraud detection system may include the behavior scoring system 1300 or communicate with the behavior scoring system (e.g., via a network) to obtain one or more similarity scores for a behavior (e.g., a transaction). The behavior scoring system 1300 may be implemented as an alternative or in combination with the behavior scoring system 1300 shown in FIG. 13A. The implementation of FIG. 13B illustrates the behavior scoring system 1300 providing one or more comparison metrics (e.g., mean, geometric mean, varying historical transaction windows, etc.) to a behavior detection system 1380. For example, the behavior detection system 1380 may wish to maintain a proprietary behavior detection methodology but may base the detection on the comparison metrics generated by the behavior scoring system 1300. As such, rather than receiving a behavior score from the behavior scoring system 1300 (as shown in FIG. 13A), a behavior comparator 1370 generates the comparison metrics based at least in part on the historical and current behavior vectors. The behavior comparator 1370 may provide the comparison metrics to the behavior detection system 1380. The behavior detection system 1380, based at least in part on the comparison metric(s), generates the final behavior score (e.g., fraud, cross-marketing, etc.). FIGS. 10-12 illustrate examples of the comparison metrics that can be generated.

Example Transaction Processing with Behavior Detection

Figure 14:
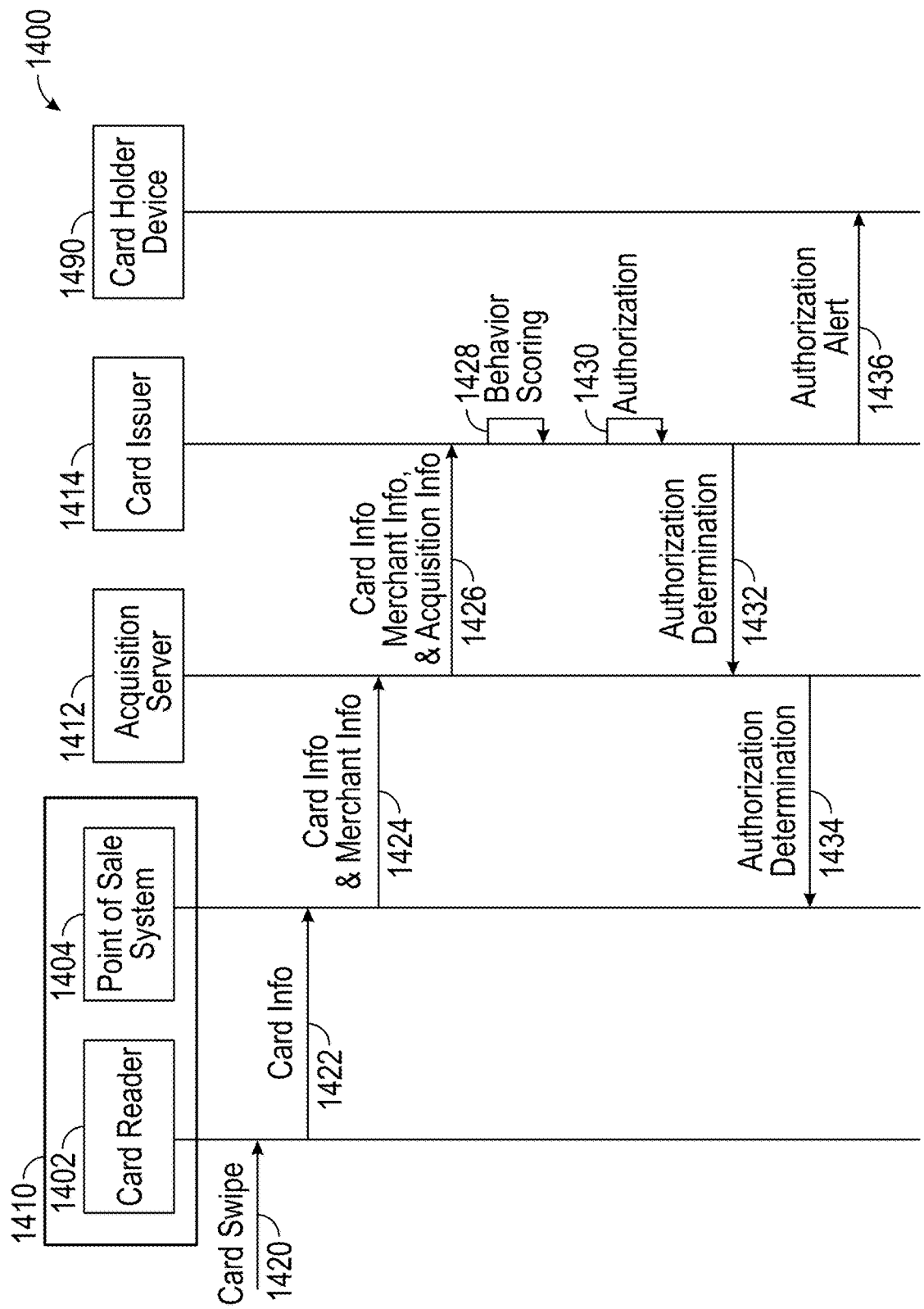
FIG. 14 shows a message flow diagram of an example transaction with behavior detection.

FIG. 14 shows a message flow diagram of an example transaction with behavior detection. A merchant system 1410 may include a card reader 1402 and a point of sale system 1404. The card reader 1402 may be configured to receive card or other payment information from a user. The card reader 1402 may be in data communication with the point of sale system 1404 to receive information collected by the card reader 1402 and other equipment at the merchant site such as a cash register, product scanner, receipt printer, display terminal, and the like. The merchant system 1410 may communicate with an acquisition server 1412. The acquisition server 1412 may be configured to determine, for payment tendered for a transaction, which issuer is responsible for the payment presented. In the case of credit cards, the issuer may be a card issuer 1414. A card holder device 1416 is also shown in FIG. 14. The card holder device 1416 is an electronic communication device associated with a user who has been issued a payment card or otherwise accesses the system to perform a transaction.

The message flow 1400 shown in FIG. 14 provides a simplified view of messages that may be exchanged between the entities shown for gathering and processing transaction data as well as analyzing behavior based on the transaction data for a user. It will be understood that additional entities may mediate one or more of the messages shown in FIG. 14.

The message flow 1400 may begin with a card swipe detection by the card reader 1402 based on a message 1420. The message 1420 may include the payment information read from the card such as from a magnetic strip, an embedded memory chip, a near-field communication element, or other information source included on the card. Via message 1422, the card information may be transmitted from the card reader 1402 to the point of sale system 1404. The point of sale system 1404 may determine that the card is a credit card and identify the acquisition server 1412 as a source for determining whether the payment is authorized.

The point of sale system 1404 may transmit a message 1424 to the acquisition server 1412 including the card information and merchant information. The merchant information may include a merchant identifier, merchant transaction information (e.g., desired payment amount), or other information available to the merchant for the transaction. The acquisition service 1412 may identify the card issuer based on the card information received and transmit a message 1426 to the card issuer 1414. The message 1426 may include the card information and merchant information received via message 1424. The message 1426 may also include information about the acquisition server 1412.

Via message 1428, the card issuer 1414 may generate a behavior score for the current transaction. This may be generated using a behavior scoring system such as the behavior scoring system 1300 shown in FIG. 13.

The card issuer 1414 may then authorize the requested payment amount via message 1430. The authorization process determines whether or not the requested payment for the transaction is to be honored. Unlike conventional authorization that may seek to authorize based on credit limit, PIN number, or other discrete transaction information for the current transaction, the authorization via message 1430 is enhanced to further consider the behavior score generated via message 1428.

Via message 1432, the authorization decision and, in some implementations, behavior score may be transmitted back to the merchant system 1410 via the acquisition server 1412. Because the behavior score may be represented using a relatively small quantity of resources, this data may be efficiently included in the current messaging used to authorize transactions. The point of sale system 1404 may use the authorization information and/or behavior score to determine whether or not to allow the transaction to proceed. If the authorization is negative, then the point of sale system 1404 may request alternate payment from the user. In some implementations, the authorization information may include an intermediate authorization indicating that the transaction is provisionally authorized but may be fraudulent. In such instances, the merchant system 1410 may collect information for secondary verification such as a photo identification, PIN request, or other information to more accurately determine whether the current behavior is consistent with the purported user's behavior.

As shown in FIG. 14, the authorization determination may be transmitted to a card holder device 1490 via message 1436. This can provide timely and important information to a card holder regarding potential fraudulent activity related to their account.

In some implementations, a client system (not shown) may receive the message 1436. In response to receiving the alert 1436, the client system may generate one or more user communications to be transmitted to the card holder device 1490, whose transactional behavior has changed. The user communications may be generated by the client system or other messaging system. The alert 1436 may include transmission of email messages directed to the user's e-mail account(s), text messages (e.g., SMS or MMS) directed to the user's mobile device, and printed messages directed by postal or other delivery services to the user's home, place of business, or other physical location.

In certain implementations, the alert 1436 is operable to automatically activate a user communication service program on the client system. The activated user communication service program automatically generates one or more communications directed to the user about whom the alert 1436 was transmitted. Generation of the user communications can be informed by the informational content of the alert 1436. The user communications are then automatically transmitted to the card holder device 1490 in one or more modes of communication, such as, for example, electronic mail, text messaging, and regular postal mail, to name a few. In certain modes of communication to the user, the user communication may be configured to automatically operate on the card holder device 1490. For example, the user's mobile device may, upon receipt of the transmitted user communication, activate a software application installed on the user's mobile device to deliver the user communication to the user. Alternatively, the user communication may activate a web browser and access a web site to present the user communication to the user. In another example, a user communication may be transmitted to a user's email account and, when received, automatically cause the user's device, such as a computer, tablet, or the like, to display the transmitted user communication. The user communication may include information about the potential fraudulent transaction such as the time, place, amount, etc. of the questionable transaction. In some implementations, the user communication may include questions about the user's behavior that can be used to verify the transaction. For example, if a transaction in Milwaukee was flagged as potentially fraudulent for a user who lives in Muskegon, the user communication may ask "Have you ridden on a ferry recently?" The user response would assist in determining whether the user visited Milwaukee recently. In some implementations, the verification may be performed in real-time (e.g., prior to consummation of the questionable transaction). In some implementations, the user communication may not be presented to the user. For example, the user communication may contact the card holder device 1490 inquiring about the location of the card holder device 1490. If the location of the device is consistent with the transaction location, it may be determined that the user is in fact conducting the transaction. The inquiry for location may cause activation of the location services on the card holder device 1490 and transmission of a currently detected location for the card holder device 1490.

Figure 15:
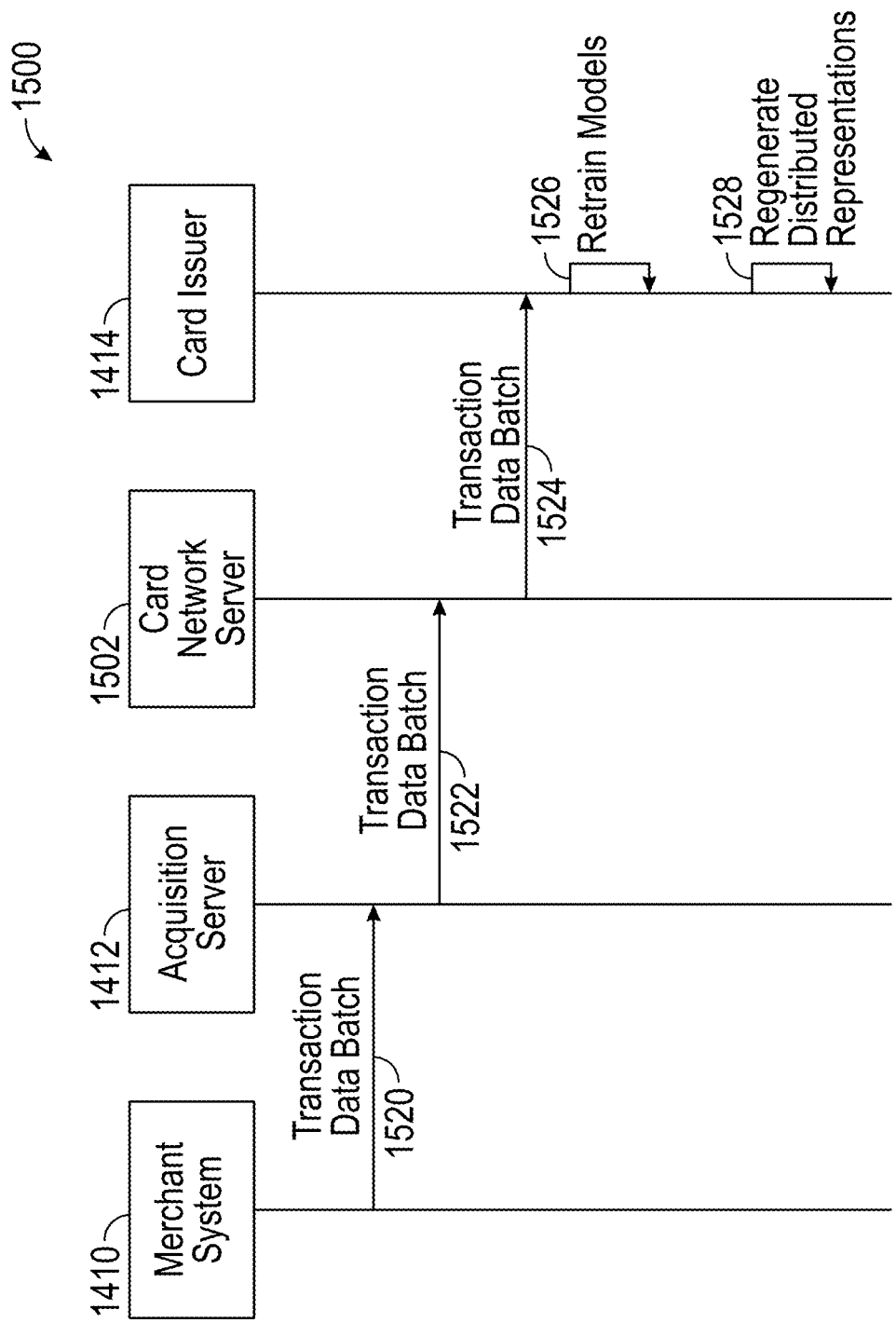
FIG. 15 shows a message flow diagram of an example batch transaction processing with model retraining and regeneration of user distributed representations.

FIG. 15 shows a message flow diagram of an example batch transaction processing with model retraining and regeneration of user distributed representations. Some of the entities shown in FIG. 15 overlap with those shown in FIG. 14. Added to FIG. 15 is a card network server 1502. The card network server 1502 is an electronic device operated by the credit card network to which a given card belongs such as VISA.

The merchant system 1410 may transmit a batch of transaction data for multiple transactions with multiple users via message 1520. The batch of transaction data from a single merchant may include hundreds, thousands, or millions of individual transaction records. The merchant system 1410 may transmit the message 1520 to the acquisition server 1412 to initiate payment for the transactions. The acquisition server 1412, via message 1522, may transmit those transactions from a specific card network to the card network server 1520 to request payment from the specific network. Because a single card network may have multiple card issuers (e.g., banks, credit unions, etc.), the card network server 1502 may split the batch of transactions by card issuer. The transactions for a specific issuer are transmitted via message 1524 to, as shown in FIG. 15, the card issuer 1414. The card issuer 1414 stores the transaction data via message 1526.

The new transaction data may also provide new information that can be used to train or retrain, via message 1526, one or more machine learning behavior detection models. The behavior detection models may include the model for generating distributed representations and/or the model for scoring the behavior of a transaction. For example, if the new transactions represent a significant percentage of the overall transaction data stored by the system 100, the retraining of the models may be desirable to ensure accurate and current detection for the users. The retraining may also be needed to account for new transaction attributes that were previously not included in the training process. The retraining may also be needed to account for new transactions for new users who were previously not included in the training process.

Having retrained the models, via message 1528, the distributed representations for the users of the card issuer 1414 may be generated. This may include generating a vector representing the historical transactions for each user or a portion of users (e.g., users with new transactions since the last time their historical vector was generated).

Example Point of Sale Card Reader

Figure 16:
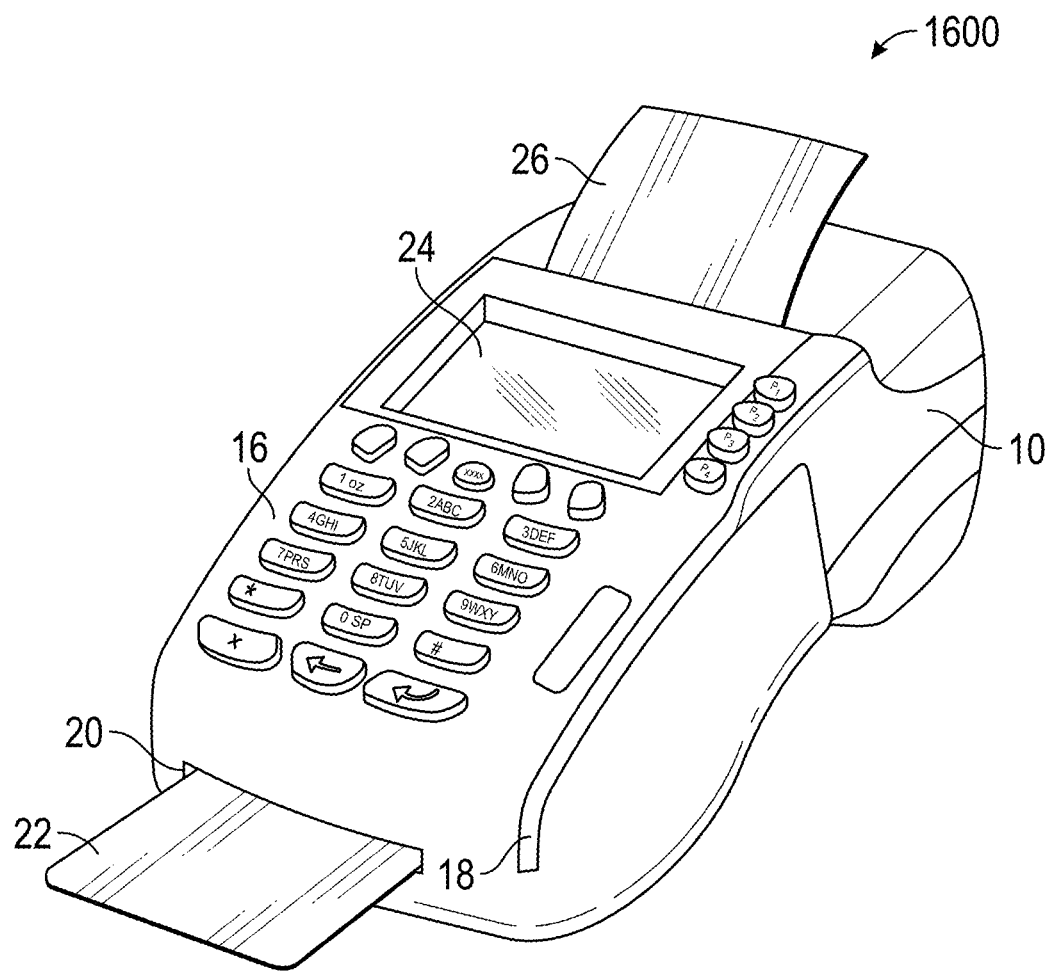
FIG. 16 shows a schematic perspective view of an example card reader.

FIG. 16 shows a schematic perspective view of an example card reader. As seen in FIG. 16, there is provided a point-of-sale card reader 1600 including a housing 10. The housing 10 may encloses transaction/event circuitry (not shown) and other electronic components to implement one or more of the behavior modeling and/or detection features described.

The reader 1600 includes a keypad 16, which interfaces with the point-of-sale transaction/event circuitry to provide input signals indicative of transaction or other events at or near the point-of-sale card reader 1600. The point-of-sale card reader 1600 also includes a magnetic card reader 18 and a smart card reader 20, which may be adapted to receive a smart card 22.

The point-of-sale card reader 1600 also includes a display 24 and a printer 26 configured to provide output information prior to, during, or after a transaction. The point-of-sale card reader 1600 may receive an authorization decision and/or behavior score for a transaction. In some implementations, the point-of-sale card reader 1600 may present a message requesting additional authorization information. For example, the behavior score may indicate a questionable transaction. In response, rather than canceling the transaction, the point-of-sale card reader 1600 may request a PIN number or other identifying information. This additional information may be used to further authorize the transaction as described above.

Figure 17:
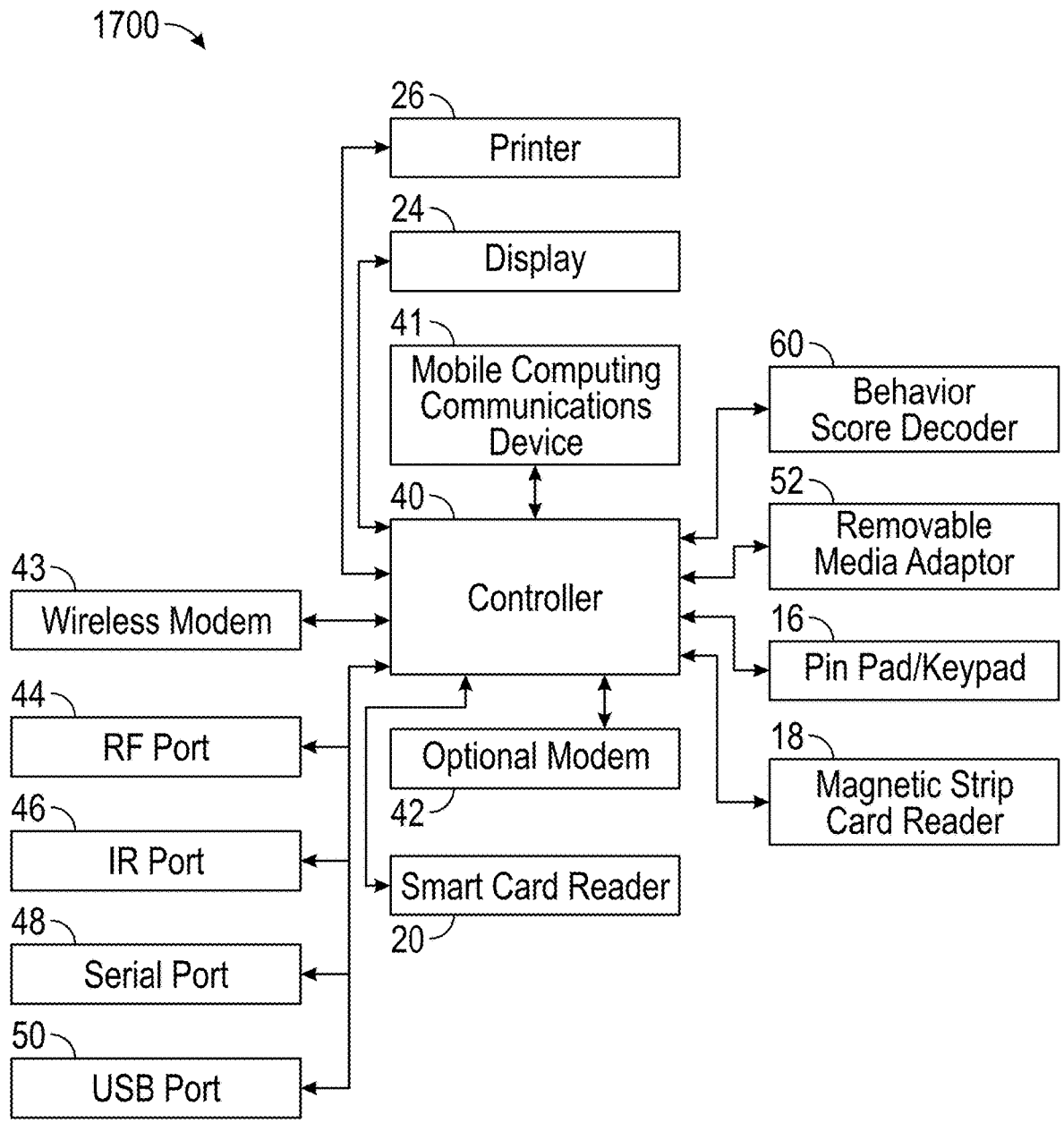
FIG. 17 shows a functional block diagram of the exemplary card reader of FIG. 16.

FIG. 17 shows a functional block diagram of the exemplary card reader of FIG. 16. A controller 40 which interfaces with the keypad 16, the display 24, the printer 26, and with a behavior score decoder 60 are shown. The controller 40, which may include card reader and/or point-of-sale terminal functionality may interface with the magnetic card reader 18 and, when available, the smart card reader 20. The controller 40 also interfaces with a mobile computing communication device 41 and may interface with an optional modem 42. The mobile computing communication device 41 and the modem 42 may be used by the reader 1300 to communicate messages such as between a point-of-sale system or other merchant transaction processing equipment.

The card reader 1700 shown in FIG. 17 includes a wireless modem 43 and various types of communications points such as an RF port 44, and IR port 46, a serial port 48, and a USB port 50. The communication ports may also be used by the reader 1700 to communicate messages as described in this application. A removable media adapter 52 may also interface with the transaction circuitry 12. Removable media may be employed for storage, archiving, and processing of data relevant to the reader 1700 functionality. For example, transaction data may be stored on removable media for transfer, at a later time, to merchant transaction processing equipment.

The behavior score decoder 60 may be configured to receive behavior scores and configure the reader 1700 in response to a received behavior score. For example, if the behavior score indicates a questionable transaction, the behavior score decoder 60 may cause the reader 1700 to obtain requested additional verification information such as via the keypad 16. In some implementations, the card reader 1700 may use one or more of the communication points to obtain one or more score decoding configurations. For example, a look up table may be provided to the card reader 1700 and stored in a memory of or accessible by the reader 1700 (not shown). The look up table may include a list of behavior scores or behavior score ranges and associated configurations for the reader 1770.

Segmentation for Improving Model Performance for Fraud/Credit Models

In some implementations, the users may be segmented. Segmentation (e.g., dividing the population into several groups and building separate models for each group) can improve the model performance. For example, segmentation may improve performance of fraud models by concentrating the model on specific behavior of the segment the model is built on (e.g., VIP segment, international segment, card not present segment, high-risk segment, or the like).

One or more of the following techniques for segmentation may be included to divide the users in the systems and methods described above:

1. Portfolio based: Separate models are created for different portfolios (e.g., VIP, prime credit user, subprime credit user, etc.);
2. Transaction type based: (e.g., international transactions, domestic transactions, Card Not Present transactions, Card Present transactions, etc.);
3. Decision Tree/Rule Based: Decision tree/rules is used to partition the data into segments (leaf nodes) by using different features.
4. Clustering based: Clustering algorithms is used in creating different segments/clusters based on some features. For example, transactional attributes or user demographic attributes may be used to define groups of users for segmentation. Examples of clustering are described in U.S. patent application Ser. No. 14/975,654, filed on Dec. 18, 2015 entitled "USER BEHAVIOR SEGMENTATION USING LATENT TOPIC DETECTION" commonly owned and assigned by applicant and hereby incorporated by reference in its entirety.

However, relying only on these segmentation techniques can produce inaccurate groupings, particularly when attempting to identify behavior anomalies. For example, in transaction type based segmentation, user's may switch from one segment to another too frequently (may even be every transaction). In portfolio based approaches, if the bank creates a new portfolio it will be difficult to decide which segment these will be scored by.

In some embodiments, a user's past behavior may be used to perform 'behavior-based' segmentation on the users to solve these issues. A user is dynamically assigned to one of the behavior segments based on which segment the user's past behavior fits the best.

In some embodiments, distributed representation transactions can be used to learn about the user's past behavior. Transaction may be described by several attributes. In some embodiments, the attributes (including composite ones) in the transactions can be represented as vectors. Then, a user may be represented as a composite vector based on the user's previous transactions.

In some embodiments, the distributed representation of a user's historical transaction data (e.g., a learned vector representation of the users' various behavior in transactions) can be grouped/clustered together. This will create groups of users with similar behavior based on their transactions. Then, by looking at past behavior of a certain user, the group most similar to this behavior can be used as the segment for this user. Grouping/clustering can be done by any clustering technique like K-Means, for example.

Separate transaction models can be built for each segment/cluster and these can be used for scoring transactions as abnormal or potentially fraudulent. Furthermore, companies can target specific users in specific groups using these segmentation techniques and can use different marketing strategies for each segment, such as those discussed below.

Marketing Applications

Whether based on individual distributed representations of users or segmented representations, the behavior detection features may be used to provide content or other information to users based on detected behaviors.

In some embodiments, the abnormality detection techniques described can be used to identify changes in life-stage such as moving, graduation, marriage, having babies, etc. When there is a change in the life-stage, the locations of the transactions, stores visited, and timing of the purchase can be different from the user's normal patterns. Therefore, identifying a reduction of the similarity between the current transactions and the historical transactions may be an indication of such events. The identification of such a change may cause selection and transmission of specific content to the user. The specific content may be selected based on the new transactions. For example, if the change detected indicates a new home, the content may be related to home ownership (e.g., home improvement stores, insurance, home service providers, appliances, etc.).

In some embodiments, the behavior information may be used to identify similar entities (e.g., merchants, users, consumers, etc.) for marketing. For example, marketers' may wish to determine the best strategy to market to users in order to increase the response rate and spending. To do so, it is often assumed that a user will respond similarly to the other users that have similar taste, or, have made similar purchases.

The distributed representation of the merchants can be used for such purpose. A distributed representation of merchants may be generated in a similar manner as described above. For example, a model may be generated based on a set of transactions received by the system for the merchant. The model may use the specific merchant as a 'word' when applying the linguistic model. Then, merchants that have high similarity after training using this approach are more likely to be shopped at by the same consumers. For example, TABLE 3 includes similarity scores for a distributed representation of users for Big Box Store to five other stores. As shown in TABLE 3, Big Box Store (BBS) is closer to New Army, Darshalls, Cool's, and Crevass, which may be stores that emphasize more on style with reasonable price than to Lmart which may be a store that focuses on discounts and value shopping.

TABLE 3

| Store | Similarity Score of Distributed Representation to Big Box Store |
|---|---|
| New Army | 0.79 |
| Darshalls | 0.76 |
| Cool's | 0.74 |
| Crevass | 0.72 |
| Lmart | 0.21 |

TABLE 4 shows the similarity scores for another distributed representation of users for Discount Big Box Store (DBBS) to four other stores. As shown in TABLE 4, DBBS is closer to Lmart, euroBush, etc. that may be retailers that focus more on discounts and value shopping than New Army.

TABLE 4

| Store | Similarity Score of Distributed Representation to Discount Big Box Store |
|---|---|
| Lmart | 0.79 |
| euroBush | 0.76 |
| Bingo Burger | 0.74 |
| Hunter's Haven | 0.72 |
| New Army | 0.11 |

Furthermore, because the merchants may be represented as using distributed representations such as vectors, the merchants can be combined such as by performing addition and subtraction on their respective vectors. Empirically it's shown that such arithmetic operation, for example, such as subtraction, on their distributed representation generates a vector that gives preference to the minuend and disfavors the subtrahend. For example, a vector representing (BBS-DBBS) may be closer to merchants associated with stylish and higher-end goods; while a vector representing (DBBS-BBS) is much closer to budget oriented goods. As another example, a vector for Crazy Kids Clothing Place (CKCP) may be added to the vector representation of (BBS-DBBS) to emphasize children's wear, a vector that's closer to high-end children clothing stores may result. In contrast, CKCP added to the vector representation of (DBBS-BBS) can result in a vector that's closer to merchants offering discount children clothing.

These properties can be used to identify and select group of consumers that have specific preference of certain types of merchants (whose vectors are $V^+$) and dislike of certain other types of merchants (whose vectors are $V^-$). This can be achieved by defining a composite vector using these merchants as a seed vector $V_s$, $$V_s = \frac{1}{Z}\left(\sum_{V_j \in V^+} V_j - \sum_{V_j \in V^-} V_j\right),$$

where Z is a normalizing term and compare it to the distributed representation of the merchants the consumers visited;

These properties can be used to identify consumers that have similar taste by comparing the distributed representation of the merchants the consumers visited. These properties can be used to segment consumers into groups of consumers that have similar transaction behaviors. To segment consumers, a composite vector may be generated by combining the distributed representation of the consumer's historical transactions. A clustering may then be performed using the composite vectors of the users such as described above. In some embodiments, the clustering can be performed using k-means clustering to find k groups $S=\{S_1, S_2, S_3, \ldots, S_k\}$ represented by their respective 'centroid' vectors so that the within-cluster sum of squares is minimized. Equation 10 below illustrates one example expression for clustering based on sum of squares minimization.

$$\operatorname*{argmin}_{s} \sum_{i=1}^{k} \sum_{x \in S_i} \|x - \mu_i\|^2 \quad \text{Equation 10}$$

where k is the number of groups;

$S_i$ is a group;

X is a member of the group $S_i$; and $\mu_i$ is the mean for the group $S_i$.

One example method of providing the recommendations may include identifying users to receive particular content. The method includes accessing, from a data store, a sequence of event records associated with a user. In some implementations, the sequence of event records indicates a history of events for the user. The method includes identifying a set of attributes of an event record to represent the event records. As discussed above the attributes serve as the "words" which will be used to generate distributed representations of the transactions. The method includes generating a model to provide a numerical representation of an event included in the history of events using values for the set of attributes of the sequence of event records. A first numerical representation of a first event at a first time indicates a higher degree of similarity to a second numerical representation of a second event at a second time than to a third numerical representation of a third event at a third time. The difference between the first time and the second time is less than the difference between the first time and the third time. The distributed representation provides resource efficiency gains. For example, the set of attributes for an individual event may be represented in a quantity of memory that is greater than a quantity of memory used to represent the distributed representation of the individual event. The method includes receiving a desired event related to a content item to be provided. The receiving may be via a network as described above and below. The method includes generating a candidate event numerical representation for the desired event using the model and the desired event. The candidate event may be a merchant or item that is to be offered and the method will identify those users having behaviors indicating a preference for the merchant or item. As such, the method identifies an event record having at least a predetermined degree of similarity with the desired event. The identification may be based on a similarity metric between a distributed representation of a user's behavior and the distributed representation of the candidate event. Once the users with the desired degree of similarity are identified, the method includes providing the content item to the identified users.

Providing the content may include transmitting a message to an electronic device of the user. The message may include transmission of email messages directed to the user's e-mail account(s), text messages (e.g., SMS or MMS) directed to the user's mobile device, and printed messages directed by postal or other delivery services to the user's home, place of business, or other physical location.

In certain implementations, the message is operable to automatically activate a user communication service program on the client system. The activated user communication service program automatically generates one or more communications directed to the user including all or a portion of the content. The user communications may then automatically transmitted to a card holder device, such as the card holder device 1490. The transmission may be via one or more modes of communication, such as, for example, electronic mail, text messaging, and regular postal mail, to name a few. In certain modes of communication to the user, the user communication may be configured to automatically operate on the card holder device receiving the communication.

Better Grouping of Merchants

There are tens of millions of merchants in the US. For applications that analyze the types of merchants that consumers visit, it may be desirable to create a categorization of the merchants so it is easier to analyze. The Merchant Category Code (MCC) used by the Card Associations such as VISA, MASTERCARD, etc., the Standard Industrial Code (SIC), and the North American Industry Classification System (NAICS) are a few attempts to do so. However, these classification systems only classify the merchants based on their industry and sub-industry groups.

In some embodiments, by using the distributed representation and the similarity definition described herein, groups of merchants may be created from diverse industries that serve similar purposes. By performing a clustering using techniques such as k-means clustering (discussed above), merchants that are related may be grouped together. For example, TABLE 5 shows a group of merchants that are related to international travel. Note, however, that none of the MCC, SIC, and NAICS has an international travel group. Furthermore, this group contains merchants from all aspects of international traveling, including airlines, hotels, international travel insurance, SIM card sales for international travel, visa services, etc. These can be identified using behavior as described above.

TABLE 5

| MCC | MCC Description | Merchant Name |
|---|---|---|
| 3005 | BRITISH AIRWAYS | BRITISH A |
| 3007 | AIR FRANCE | AIR FRANCE 0571963678061 |
| 3010 | KLM (ROYAL DUTCH AIRLINES) | KLM BELGIUM 0742469054336 |
| 3012 | QUANTAS | QANTAS AIR 08173363730 |
| 3056 | QUEBECAIRE | JET AIR 5894149559583 |
| 3077 | THAI AIRWAYS | WWW.THAIAIRW1234567890 |
| 3078 | CHINA AIRLINES | CHINA AIR2970836417640 |
| 3079 | Airlines | JETSTAR AIR B7JLYP |
| 3161 | ALL NIPPON AIRWAYS | ANAAIR |
| 3389 | AVIS RENT-A-CAR | AVIS RENT A CAR |
| 3503 | SHERATON HOTELS | SHERATON GRANDE SUKHUMVIT |
| 3545 | SHANGRI-LA INTERNATIONAL | MAKATI SHANGRI LA HOTE |

TABLE 5-continued

| MCC | MCC Description | Merchant Name |
|---|---|---|
| 3572 | MIYAKO HOTELS | SHERATON MIYAKO TOKYO H |
| 3577 | MANDARIN ORIENTAL HOTEL | MANDARIN ORIENTAL, BANGKOK |
| 3710 | THE RITZ CARLTON HOTELS | THE RITZ-CARLTON, HK16501 |
| 4011 | Railroads | JR EAST |
| 4111 | Local/Suburban Commuter . . . | MASS TRANSIT RAILWAY |
| 4111 | Local/Suburban Commuter . . . | XISHIJI CRUISES |
| 4112 | Passenger Railways | Taiwan High Speed Rail |
| 4121 | Taxicabs and Limousines | AIZUNORIAIJIDOSHIYA KA |
| 4131 | Bus Lines, Including Charters . . . | CE/CRUZ DEL SUR |
| 4215 | Courier Services Air or Ground . . . | MYUS.COM |
| 4511 | Airlines, Air Carriers (not listed . . . | CAMBODIA ANGKOR AIR-TH |
| 4511 | Airlines, Air Carriers (not listed . . . | JETSTAR PAC |
| 4722 | Travel Agencies and Tour Operations | CHU KONG PASSENGER 28902 |
| 4722 | Travel Agencies and Tour Operations | HOSTEL WORLD |
| 4814 | Fax services, Telecommunication | ONESIMCARD.COM |
| 4814 | Fax services, Telecommunication | PREPAID ONLINE TOP UP |
| 5192 | Books, Periodicals, and Newspapers | RELAY |
| 5200 | Home Supply Warehouse Stores | FUJI DOLL CHUOU |
| 5251 | Hardware Stores | TRUE VALUE AYALA CEBU |
| 5300 | Wholesale Clubs | COSTCO GUADALAJARA |
| 5309 | Duty Free Store | BEIRUT DUTY FREE ARRIVAL |
| 5309 | Duty Free Store | DFS INDIA PRIVATE LIMI |
| 5411 | Grocery Stores, Supermarkets | RUSTAN S SUPERMARKET |
| 5411 | Grocery Stores, Supermarkets | VILLA MARKET-NICHADA |
| 5499 | Misc. Food Stores Convenience . . . | HAKATAFUBIAN |
| 5499 | Misc. Food Stores Convenience . . . | I-MEI FOODS CO., LTD |
| 5719 | Miscellaneous Home Furnishing . . . | KULTURA FILIPINO SM C |
| 5812 | Eating places and Restaurants | RI YI CAN YIN |
| 5813 | Drinking Places (Alcoholic . . . | SHANGHAI PRESIDENT COFFEE |
| 5814 | Fast Food Restaurants | AJISEN RAMEN 02800 |
| 5814 | Fast Food Restaurants | MCDONALD'S AIRPORT(290 |
| 5947 | Card Shops, Gift, Novelty, and . . . | SENTOSA LEISURE MANAGE |
| 5949 | Sewing, Needle, Fabric, and Price . . . | SHANG HAI YUGUI INDUS |
| 5962 | Direct Marketing Travel Related . . . | CTRIP SH HUACHENG TRAVEL |
| 5964 | Direct Marketing Catalog . . . | AMAZON.CO.JP |
| 5994 | News Dealers and Newsstands | LS TRAVEL RETAIL DEUTSCHL |
| 5999 | Miscellaneous and Specialty Retail | MAXVALUKURASHIKAN ICHIHAM |
| 6010 | Financial Institutions Manual Cash | 012BANCO DE CHILE VISA |
| 6300 | Insurance Sales, Underwriting, and . . . | WORLD NOMADS |
| 6513 | Real Estate Agents and Managers — . . . | PAY*KOKO RESORTS INC |
| 7299 | Miscellaneous Personal Services ( . . . | CHINA VISA SERVICE CENTER |
| 7299 | Miscellaneous Personal Services ( . . . | PASSPORTS & VISA.COM |
| 7311 | Advertising Services | AMOMA |
| 7399 | Business Services, Not Elsewhere . . . | MAILBOX FORWARDING, IN |
| 7941 | Commercial Sports, Athletic Fields | SINGAPORE FLYER PL |
| 7991 | Tourist Attractions and Exhibits | AT THE TOP LLC |
| 7996 | Amusement Parks, Carnivals, Circuses | Hong Kong Disneyland Lant |
| 8062 | Hospitals | BUMRUNGRAD HOSPITAL |
| 8641 | Civic, Fraternal, and Social Associations | INTERNATIONS GMBH |
| 8699 | Membership Organizations (Not . . . | PRIORITY PASS, INC |
| 8999 | Professional Services (Not . . . | U.S. VISA PLICATIONFEE |
| 9399 | Government Services (Not . . . | CN E US CONSULAT SHA |

In some embodiments, by using the fact that consumers tend to shop at merchants at similar pricing level, the system can also use the same technique to classify hotels into low-end vs. high-end ones as they tend to have different distributed representations.

Figure 18:
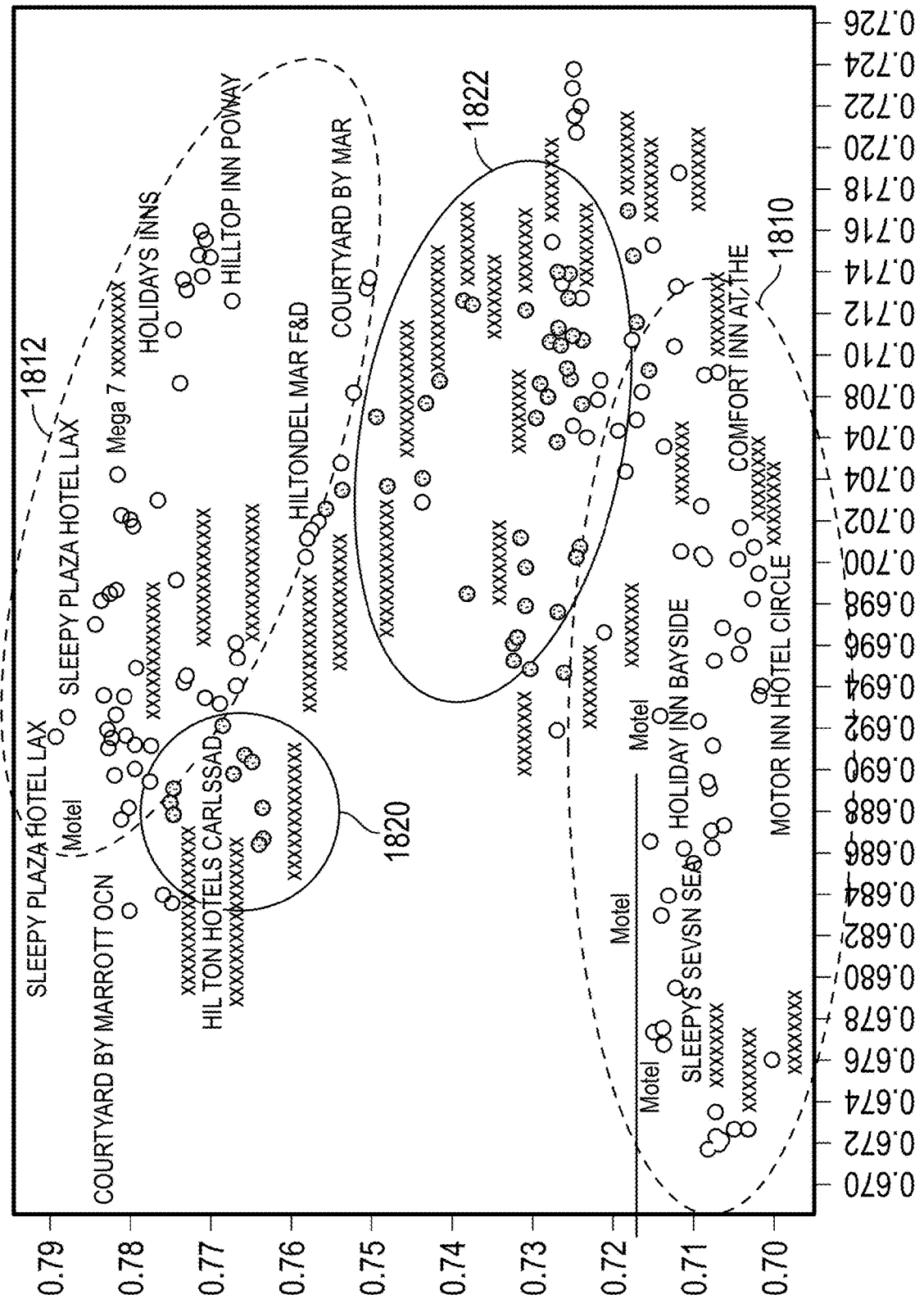
FIG. 18 shows a plot of merchant clusters.

FIG. 18 shows a plot of merchant clusters. The vectors for transactions at particular merchants can be projected from many dimensions to the two dimensions shown in FIG. 18. The x and y axes illustrate two dimensions representing the 'similarity' relation among the merchants. The plot 1800 may include clusters of merchants. For example, a cluster 1810 and a cluster 1812, may represent a collections of merchants associated with a particular price point. Other merchants associated with a second price point may be grouped in cluster 1820 and cluster 1822. The projection may be taken from the vector representations of the transactions without analyzing the textual names of the merchant or amount of the transaction. This shows that without the knowledge of the identity or prices of the hotels, through clustering, similarities between groups of merchants may be automatically discovered.

Credit Risk/Attrition Applications

In account management, banks attempt to predict the users' potential to default or attrite in order to reduce the banks' exposure to their debt, and ensure their users continue to spend. Such business problems can benefit significantly from analyzing the users' behavior. The consumers' credit risk can increase when they: encounter life-stage change that may incur significant debt or become unable to afford the expense; begin to exhibit abnormal spending behavior; transact in stores that tend to attract consumers with financial difficulty; or; exhibit similar behavior to other consumers that more likely to default with the same behavior profile.

Similarly, the consumers likelihood of stopping using the bank's credit card can increase when they: encounter life-stage change that requires different types of product features in the credit cards; begin to exhibit abnormal spending behavior; and/or exhibit similar behavior to other consumers that more likely to attrite with the same behavior profile.

Therefore, the features described above, e.g. behavior abnormality detection, life-stage change detection, improved grouping of merchants, user segmentation, etc., can be applied to detect credit risk and attrition risk.

As an example, in some embodiments, the system may apply the behavior abnormality determination and life-stage change detection mentioned previously in the models to identify behavior shift in the user's spending. When detected, if the shift is indicating that the user is engaging riskier spending in merchants that indicative of financial distress, a credit-risk related treatment can be applied to the consumer. One benefit of these features, is that merchants may be grouped and analyzed without necessarily identifying a merchant by name. For example, the targeting may be based on the similarity between a merchant and others within a similar category (e.g., casino, coffee shops, etc.) The categories need not be known a priori either. As transaction vectors are compared, similarities may be discovered in the way certain merchants cluster. A cluster may then be associated with a level of riskiness or other measure of risk assessment. On the other hand, if the behavior shift indicates a life-stage change that the existing features in the credit is not likely to fit the consumer's new need, an attrition treatment with product cross-sell/up-sell or targeted incentives can be offer to the consumer.

Example System Implementation and Architecture

FIG. 19 shows a block diagram showing example components of a transaction analysis computing system 1900. The computing system 1900 includes, for example, a personal computer that is IBM, Macintosh, or Linux/Unix compatible or a server or workstation. In one embodiment, the computing system 1900 comprises a server, a laptop computer, a smart phone, a personal digital assistant, a kiosk, or a media player, for example. In one embodiment, the exemplary computing system 1900 includes one or more central processing unit ("CPU") 1905, which may each include a conventional or proprietary microprocessor. The computing system 1900 further includes one or more memory 1932, such as random access memory ("RAM") for temporary storage of information, one or more read only memory ("ROM") for permanent storage of information, and one or more mass storage device 1922, such as a hard drive, diskette, solid state drive, or optical media storage device. Typically, the components of the computing system 1900 are connected to the computer using a standard based bus system 1980. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 1900 may be combined into fewer components and modules or further separated into additional components and modules.

The computing system 1900 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 1900 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 1900 may include one or more commonly available input/output (I/O) devices and interfaces 1912, such as a keyboard, mouse, touchpad, and printer. In one embodiment, the I/O devices and interfaces 1912 include one or more display devices, such as a monitor, that allows the visual presentation of data to a user. More particularly, a display device provides for the presentation of GUIs, application software data, and multimedia presentations, for example. The computing system 1900 may also include one or more multimedia devices 1942, such as speakers, video cards, graphics accelerators, and microphones, for example.

In the embodiment of FIG. 21, the I/O devices and interfaces 1912 provide a communication interface to various external devices. In the embodiment of FIG. 19, the computing system 1900 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the credit bureau data source and financial information data sources.

In some embodiments, information may be provided to the computing system 1900 over a network from one or more data sources. The data sources may include one or more internal and/or external data sources that provide transaction data, such as credit issuers (e.g., financial institutions that issue credit cards), transaction processors (e.g., entities that process credit card swipes at points of sale), and/or transaction aggregators. The data sources may include internal and external data sources which store, for example, credit bureau data (for example, credit bureau data from File One$^{SM}$) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 19, the modules 1910 may be configured for execution by the CPU 1905 to perform any or all of the processes or generate any or all of the interfaces discussed above with reference to FIGS. 1-18. For example, the modules 1910 may be implemented as instructions residing in a memory (such as the memory 1932) that, when executed, cause the transaction analysis system 1900 to perform all or some of the functions described. In some implementations, one or more of the modules 1910 may be implemented as a hardware device (e.g., circuit) configured to perform the functions described.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computer-implemented method of artificial intelligence guided monitoring of event data, the method comprising:

under control of one or more computing devices configured with specific computer-executable instructions, accessing, from a data store, a sequence of event records associated with a user, the sequence of event records indicating a history of events for the user;

identifying a set of attributes of an event record to represent the event records;

generating a model to provide a vector representing an event included in the history of events using values for the set of attributes of the sequence of event records, wherein the model normalizes the vector to a common magnitude using a co-occurrence of the set of attributes, wherein a first vector representing a first event at a first time indicates a higher degree of similarity to a second vector representing a second event at a second time than to a third vector representing a third event at a third time, wherein a first difference between the first time and the second time is less than a second difference between the first time and the third time;

receiving, from a first computing device, information regarding a candidate event for the user;

generating a candidate event vector using the model and the information regarding the candidate event;

identifying a behavior anomaly using a degree of similarity between the candidate event vector and a prior event vector representing a prior event corresponding to the prior behavior of the user, wherein the degree of similarity is generated using an exponentially weighted moving average based on (1) the candidate event vector and (2) the vectors representing a set of prior events, and wherein a decay factor is applied to adjust a weight that a given prior event has on the exponentially weighted moving average such that earlier events have a lower weight than more recent events; and providing an indication of the behavior anomaly for the candidate event.

2. The computer-implemented method of claim 1, wherein identifying the behavior anomaly further comprises:

identifying a set of prior events representing past behavior of the user, the set of prior events including the prior event; and generating the degree of similarity between the candidate event vector and vectors representing the set of prior events.

3. The computer-implemented method of claim 2, further comprising generating a candidate event vector representing each of the set of prior events.

4. The computer-implemented method of claim 2, wherein the degree of similarity is generated using a mean of similarity values between the candidate event vector and the vectors representing the set of prior events.

5. The computer-implemented method of claim 2, wherein the degree of similarity is generated using a maximum or a minimum similarity value between the candidate event vector and the vectors representing the set of prior events.

6. The computer-implemented method of claim 1, further comprising generating a composite vector for the user based on a plurality of vectors representing prior events for the user.

7. The computer-implemented method of claim 1, wherein the degree of similarity is further based at least in part on a maturation window size that is selected based on the candidate event.

8. The computer-implemented method of claim 1, further comprising:

receiving anomaly indicators for a set of prior events of the user; and generating an anomaly model that combines similarity metrics of the set of prior events to generate an output determination for an individual prior event corresponding to an anomaly indicator for the individual prior event.

9. The computer-implemented method of claim 1, wherein the first computing device comprises a card reading device, and wherein receiving the candidate event for the user comprises receiving, from the card reading device, an authorization request including the candidate event, and wherein providing the indication of the behavior anomaly comprises providing an authorization response indicating the candidate event is unauthorized.

10. A non-transitory computer readable medium including computer-executable instructions that, when executed by a computing system, cause the computing system to perform operations comprising:

receiving, from a first computing device, a candidate event for a user;

generating a candidate event vector using a model and the candidate event, wherein the model normalizes the vector to a common magnitude;

identifying a behavior anomaly using a degree of similarity between the candidate event vector and a prior event vector representing a prior event corresponding to the prior behavior of the user, wherein the degree of similarity is generated using an exponentially weighted moving average based on (1) the candidate event vector and (2) the vectors representing a set of prior events, and wherein a decay factor is applied to adjust a weight that a given prior event has on the exponentially weighted moving average such that earlier events have a lower weight than more recent events; and providing an indication of the behavior anomaly for the candidate event for the user.

11. The non-transitory computer readable medium of claim 10, the operations further comprising:

accessing, from a data store, a sequence of event records associated with the user, the sequence of event records indicating a history of events for the user;

identifying a set of attributes of an event record to represent the event records; and generating a model to provide the vector of the prior event included in the history of events using values for the set of attributes.

12. The non-transitory computer readable medium of claim 10, wherein a vector representation of a first event at a first time indicates a higher degree of similarity to a second vector representation of a second event at a second time than to a third vector representation of a third event at a third time, wherein a first difference between the first time and the second time is less than a second difference between the first time and the third time.

13. The non-transitory computer readable medium of claim 10, the operations further comprising receiving a third-party behavior score for the user from a third-party behavior scoring system, wherein identifying the behavior anomaly is further based at least in part on the third-party behavior score.

14. The non-transitory computer readable medium of claim 10, wherein providing the indication of the behavior anomaly comprises providing an authorization response indicating a transaction associated with the candidate event is unauthorized.

15. The non-transitory computer readable medium of claim 14, wherein the authorization response causes the first computing device to acquire additional event information to authorize the transaction associated with the candidate event.

16. A computer system comprising:

memory; and at least one computing device configured with computer-executable instructions that, when executed, cause the at least one computing device to:

receive, from a first computing device, a candidate event for a user;

generate a candidate event vector using a model and the candidate event, wherein the model normalizes the vector to a common magnitude;

identify a behavior anomaly using a degree of similarity between the candidate event vector and a prior event vector representing a prior event corresponding to the prior behavior of the user, wherein the degree of similarity is generated using an exponentially weighted moving average based on (1) the candidate event vector and (2) the vectors representing a set of prior events, and wherein a decay factor is applied to adjust a weight that a given prior event has on the exponentially weighted moving average such that earlier events have a lower weight than more recent events; and provide, to a computing device remote from the computer system, an indication of the behavior anomaly for the candidate event for the user.

17. The computer system of claim 16, wherein providing the indication of the behavior anomaly comprises providing an authorization response indicating a transaction associated with the candidate event is unauthorized.

18. The computer system of claim 17, wherein the authorization response causes the computing device remote from the computer system to acquire additional event information to authorize the transaction associated with the candidate event.

19. The computer system of claim 16, further comprising generating a candidate event vector representing each of the set of prior events.

20. The computer system of claim 16, wherein the degree of similarity is generated using a maximum or a minimum similarity value between the candidate event vector and the vectors representing the set of prior events.

* * * * *